United States Patent
Zhou et al.

(10) Patent No.: US 11,206,433 B2
(45) Date of Patent: Dec. 21, 2021

(54) GENERATING AUGMENTED VIDEOS

(71) Applicant: Oath Inc., New York, NY (US)

(72) Inventors: Xingyue Zhou, New York, NY (US); Andrew Edward Kae, Staten Island, NY (US); Guy Dassa, Mamaroneck, NY (US)

(73) Assignee: VERIZON MEDIA INC., New York, NY (US)

( * ) Notice: Subject to any disclaimer, the term of this patent is extended or adjusted under 35 U.S.C. 154(b) by 0 days.

(21) Appl. No.: 16/406,106

(22) Filed: May 8, 2019

(65) Prior Publication Data
US 2020/0359064 A1 Nov. 12, 2020

(51) Int. Cl.
| | |
|---|---|
| *H04N 21/234* | (2011.01) |
| *G06K 9/00* | (2006.01) |
| *H04N 21/81* | (2011.01) |
| *G06T 19/00* | (2011.01) |
| *H04N 21/2343* | (2011.01) |
| *G06T 7/246* | (2017.01) |
| *H04N 21/43* | (2011.01) |

(52) U.S. Cl.
CPC ... *H04N 21/23412* (2013.01); *G06K 9/00744* (2013.01); *G06T 7/251* (2017.01); *G06T 19/006* (2013.01); *H04N 21/23418* (2013.01); *H04N 21/234345* (2013.01); *H04N 21/4307* (2013.01); *H04N 21/816* (2013.01)

(58) Field of Classification Search
CPC ....... H04N 21/23412; H04N 21/23418; H04N 21/234345; H04N 21/816; H04N 21/4307; G06T 7/251; G06T 19/006; G06K 9/00744
See application file for complete search history.

(56) References Cited

U.S. PATENT DOCUMENTS

| | | | |
|---|---|---|---|
| 2011/0188836 A1* | 8/2011 | Popkiewicz | G06Q 30/02 386/278 |
| 2015/0206290 A1* | 7/2015 | Ryu | G06T 5/003 382/255 |
| 2018/0365884 A1* | 12/2018 | Skidmore | G06T 7/254 |
| 2020/0082588 A1* | 3/2020 | Fink | G06K 9/726 |
| 2020/0193206 A1* | 6/2020 | Turkelson | G06K 9/00671 |

* cited by examiner

*Primary Examiner* — William A Beutel
(74) *Attorney, Agent, or Firm* — Cooper Legal Group, LLC

(57) ABSTRACT

One or more computing devices, systems, and/or methods for generating augmented videos are provided. First coordinates, of a first video frame of a video, may be determined for projection of a graphical object. A first plurality of keypoints on the first video frame may be determined based upon a set of objects. A second plurality of keypoints on a second video frame may be determined. A keypoint of the second plurality of keypoints may correspond to a keypoint of the first plurality of keypoints. A relationship between the first video frame and the second video frame may be determined based upon the first plurality of keypoints and the second plurality of keypoints. Second coordinates of the second video frame may be determined based upon the first coordinates and the relationship. The graphical object may be projected onto the second video frame based upon the second coordinates.

20 Claims, 13 Drawing Sheets

GENERATING AUGMENTED VIDEOS

BACKGROUND

Many services, such as websites, applications, etc. may provide platforms for viewing and/or downloading videos from a server. For example, an application may enable a user and/or a client device to consume and/or download an augmented video having an image projected onto a portion of the video.

SUMMARY

In accordance with the present disclosure, one or more computing devices and/or methods are provided. In an example, a request to generate an augmented video based upon a graphical object and a video may be received. A first set of coordinates, of a first video frame of a plurality of video frames of the video, may be determined for projection of the graphical object. The graphical object may be projected onto the first video frame based upon the first set of coordinates. A set of objects within the first video frame may be determined. A first plurality of keypoints on the first video frame may be determined based upon the set of objects. Keypoints of the first plurality of keypoints may not intersect with the set of objects. The set of objects may comprise one or more moving objects and/or one or more unstable objects. A second plurality of keypoints on a second video frame of the plurality of video frames may be determined. The second plurality of keypoints may be associated with the first plurality of keypoints. For example, a keypoint of the second plurality of keypoints may correspond to a keypoint of the first plurality of keypoints. A relationship (e.g., a homography) between the first video frame and the second video frame may be determined based upon the first plurality of keypoints and the second plurality of keypoints. A second set of coordinates of the second video frame may be determined for projection of the graphical object based upon the first set of coordinates and/or the relationship between the first video frame and the second video frame. The graphical object may be projected onto the second video frame based upon the second set of coordinates. The graphical object may be projected onto a second plurality of video frames of the plurality of video frames to generate the augmented video. Alternatively and/or additionally, a third set of coordinates of a third video frame of the second plurality of video frames may be determined for projection of the graphical object. A second set of objects within the third video frame may be determined. A first set of pixels of the third video frame associated with a positional overlap of the second set of objects and the graphical object may be determined. The graphical object may be projected onto the third video frame based upon the third set of coordinates and/or the first set of pixels of the third video frame.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
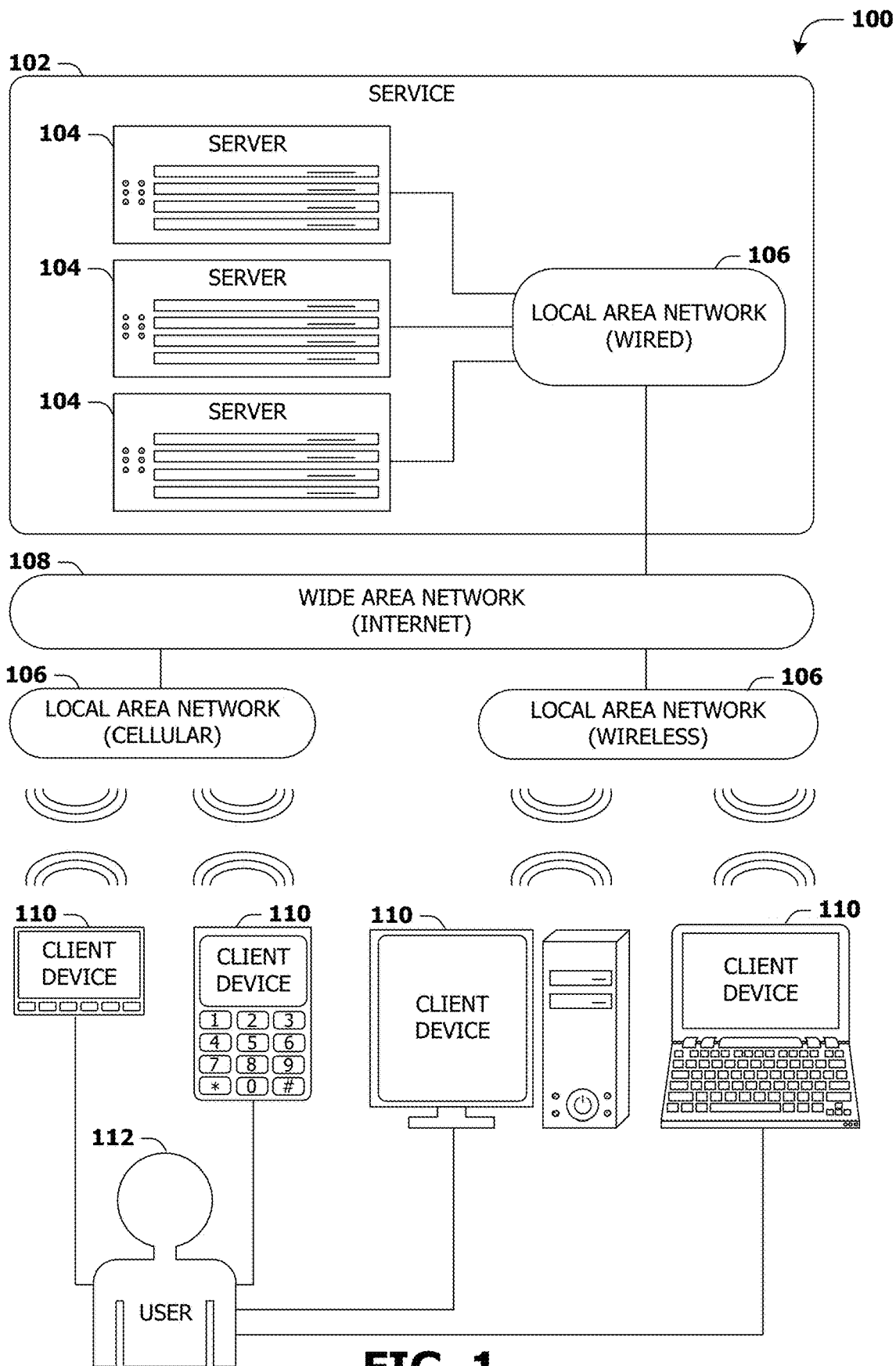
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
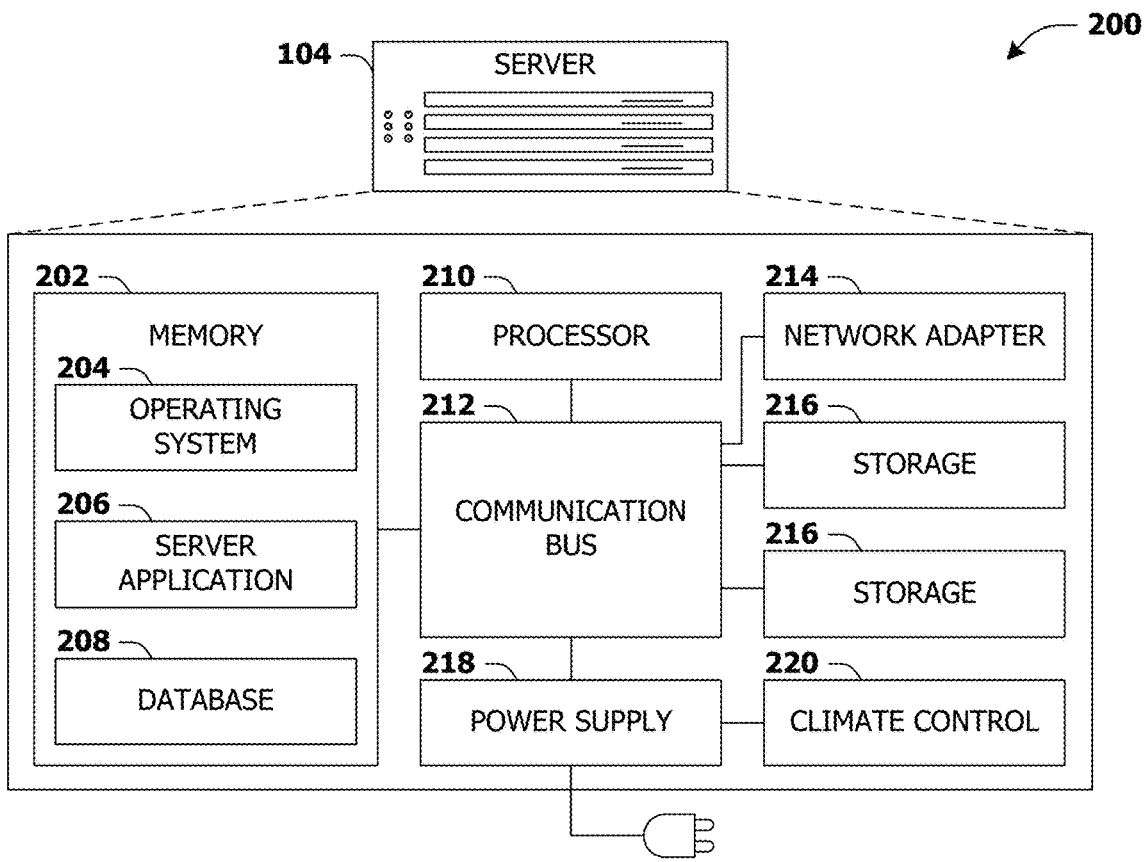
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
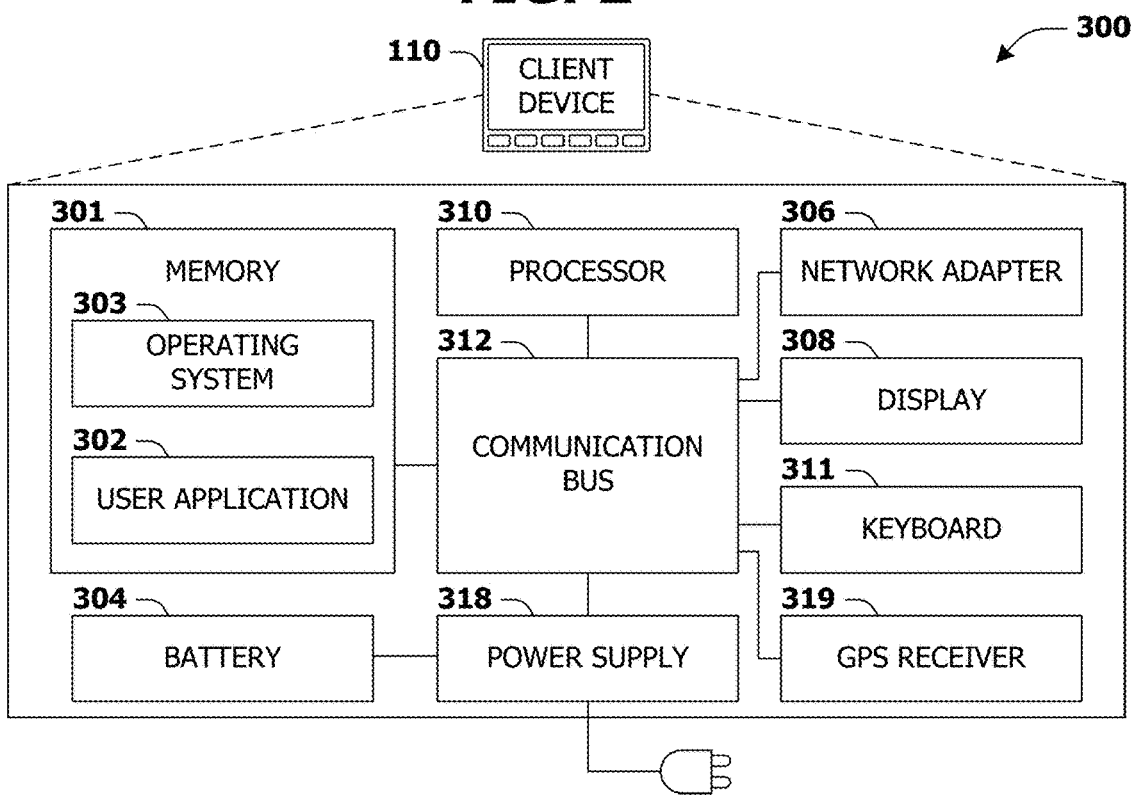
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 110 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for generating augmented videos are provided. In some examples, an entity (e.g., a user, an organization, a company, a brand, a filmmaker, etc.) may want to include a graphical object associated with the entity in a video. For example, the graphical object may comprise one or more of an image, a three-dimensional object, an animation, etc. In some examples, the graphical object may be an advertisement and/or may be associated with promoting the entity (e.g., promoting one or more services and/or one or more products associated with the entity) and/or may convey a message (e.g., the graphical object may comprise text and/or a symbol associated with the message) to consumers of the graphical object and/or the video. Alternatively and/or additionally, the graphical object may be associated with visual art and/or a special effect that the entity (e.g., an artist, a graphics designer, etc.) may want to include in the video. However, in some example systems, special equipment (e.g., one or more additional cameras, an RGB-depth (RGB-D) sensor, etc.) may be required during filming of the video to (later) include the graphical object in the video, increasing costs associated with creating the video. Accordingly, the example systems are unable to include graphical objects in videos that are created without the special equipment.

Thus, in accordance with one or more of the techniques presented herein, an augmented video (comprising a representation of the graphical object) may be generated based upon the graphical object and the video (without requiring the special equipment). A first set of coordinates of a first video frame of the video may be determined for projection of the graphical object. For example, the first set of coordinates may be associated with a surface within the first frame (e.g., the surface may correspond to a planar surface, such as one or more of a wall, a table, a floor, etc.). The graphical object may be projected onto the first video frame based upon the first set of coordinates. In an example, the graphical object may be projected onto a region of the first video frame within the first set of coordinates and/or overlaid onto the first set of coordinates.

A set of objects within the first video frame may be determined (e.g., the set of objects may be determined using one or more object detection techniques and/or one or more object segmentation techniques). In some examples, the set of objects may correspond to one or more of one or more moving objects, one or more people, one or more balls, one or more sports players, one or more bicycles, etc. A first plurality of keypoints on the first video frame may be determined based upon the set of objects. In some examples, keypoints of the first plurality of keypoints may not intersect with (and/or may not correspond to) the set of objects. A second plurality of keypoints on a second video frame of the video may be determined. Keypoints of the second plurality of keypoints may correspond to keypoints of the first plurality of keypoints. A relationship (e.g., a homography) between the first video frame and the second video frame may be determined based upon the first plurality of keypoints and/or the second plurality of keypoints (e.g., the relationship may be determined based upon a comparison of keypoints of the first plurality of keypoints with keypoints of the second plurality of keypoints).

A second set of coordinates of the second video frame may be determined for projection of the graphical object based upon the first set of coordinates and/or the relationship between the first video frame and the second video frame. The graphical object may be projected onto the second video frame based upon the second set of coordinates. The graphical object may be projected onto a plurality of video frames of the video to generate the augmented video. For example, the graphical object may be projected onto the plurality of video frames by performing a propagation process to propagate the graphical object to the plurality of video frames (e.g., the graphical object may be projected onto the plurality of video frames sequentially and/or non-sequentially). For example, the graphical object may be projected onto a first set of video frames of the plurality of video frames preceding the first video frame and/or onto a second set of video frames of the plurality of video frames following the first video frame. For example, the graphical object may be projected onto the first set of video frames frame-by-frame in a backward direction with respect to an order of video frames of the plurality of video frames until a third video frame preceding the first set of video frames is reached which meets one or more conditions (e.g., user-inputted conditions) and/or which does not have a view of the surface upon which the graphical object is configured to be projected. Alternatively and/or additionally, the graphical object may be projected onto the second set of video frames frame-by-frame in a forward direction with respect to the order of video frames of the plurality of video frames until a fourth video frame following the second set of video frames is reached which meets the one or more conditions and/or which does not have a view of the surface upon which the graphical object is configured to be projected. Alternatively and/or additionally, the graphical object may not be projected onto video frames (e.g., the third video frame and/or the fourth video frame) that meet the one or more conditions and/or do not have a view of the surface upon which the graphical object is configured to be projected. It may be appreciated that determining the set of objects and/or determining the first plurality of keypoints based upon the set of objects may increase a stability of the graphical object on the surface and/or a quality of the augmented video (e.g., the graphical object may appear more realistic to a consumer viewing the augmented video).

In some examples, the augmented video may be presented via a content platform for viewing and/or downloading content (e.g., videos, music, articles, etc.) associated with a content system. The content platform may be accessed via an application, a content interface, a browser, etc. of a client device. In some examples, rather than presenting the video and/or the graphical object separately via the client device, the augmented video may be presented with the representation of the graphical object included within augmented video. This may be compared with techniques for presenting content associated with the entity (e.g., advertisements and/or promotional content) to users where the content may be overlaid onto the video (inhibiting a user's view of the video for a period of time), adjacent to the video (distracting the user from viewing the video), and/or where access to the video is prevented until content (e.g., a video clip) associated with the entity has been (fully and/or partially) presented and/or a selection of the content has occurred (which may cause the user to spend time viewing the content, rather than the video). Thus, by presenting the augmented video rather than presenting the video and content (associated with the entity) separately, the user may have a more seamless and/or enjoyable experience consuming the augmented video.

Figure 4:
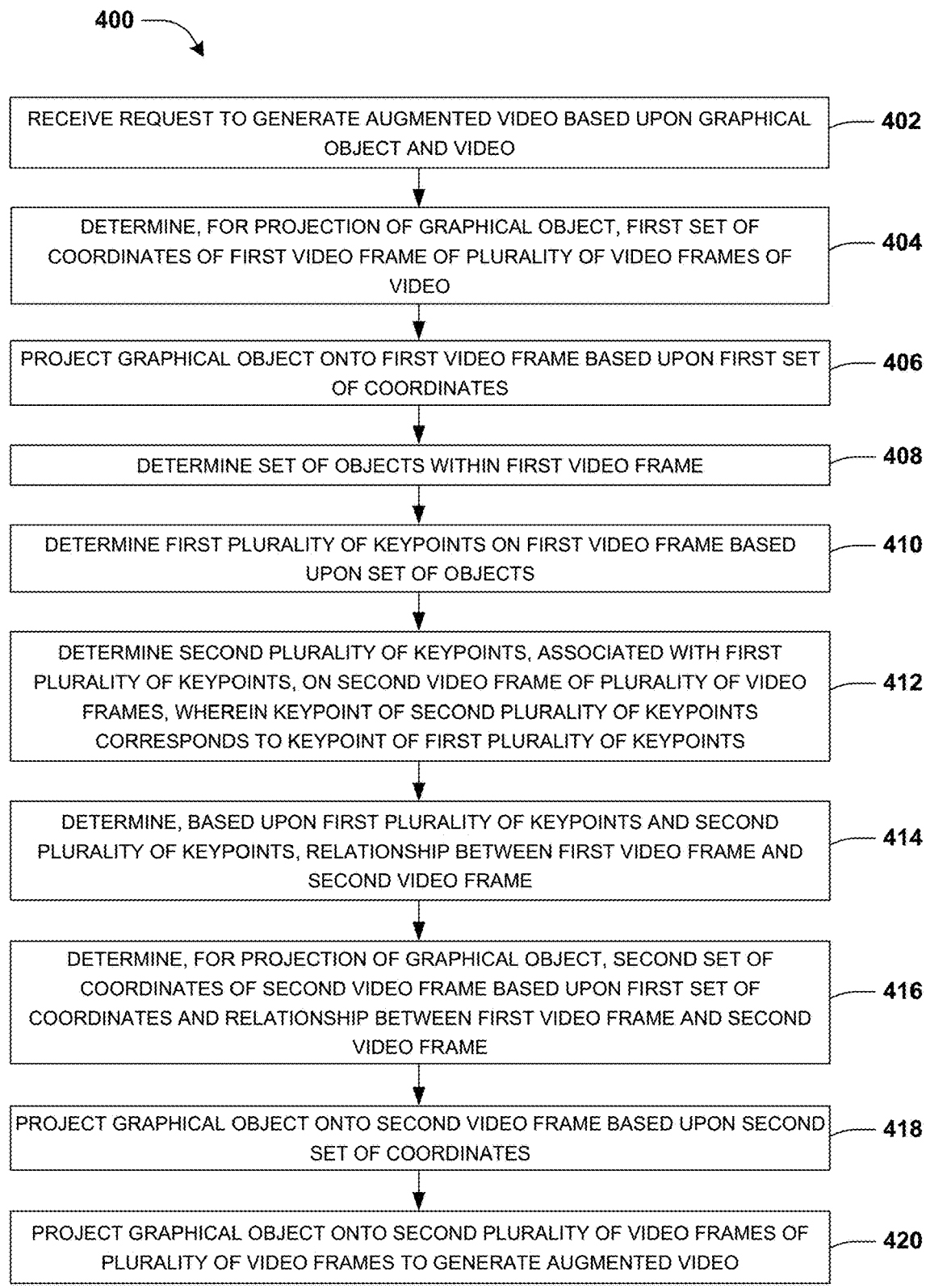
FIG. 4 is a flow chart illustrating an example method for generating augmented videos.

An embodiment of generating augmented videos is illustrated by an example method 400 of FIG. 4. At 402, a first request to generate a first augmented video based upon a first graphical object and/or a first video may be received. The first request may correspond to a request to include the first graphical object in the first video to generate the first augmented video. In some examples, the first request may be received from a client device associated with an entity via a video interface associated with augmenting videos. For example, the video interface may be accessed via the client device. The first request may comprise the first video and/or the first graphical object. For example, the first video and/or the first graphical object may be uploaded to a server associated with a video augmentation system via the video interface. In some examples, the video interface may be one or more of an application, a website accessed via a browser, software installed on the client device, etc.

Alternatively and/or additionally, the video augmentation system may be run using the client device. For example, the video augmentation system may be an application and/or software installed onto the client device. Alternatively and/or additionally, the video augmentation system may be associated with a software development kit (SDK) stored within memory of the client device. Alternatively and/or additionally, operations associated with generating augmented videos based upon videos and/or graphical objects may be performed by the video augmentation system using a processor of the client device and/or using a server connected to the client device. In some examples, the video augmentation system may not be limited to running on a single operating system (e.g., the video augmentation system may be compatible with various operating systems).

In some examples, the first video and/or the first graphical object may be comprised within a content database. In some examples, the first request may comprise a video identifier corresponding to the first video and/or a graphical object identifier corresponding to the first graphical object. The content database may be analyzed based upon the video identifier to identify the first video and/or extract the first video from the content database. Alternatively and/or additionally, the content database may be analyzed based upon the graphical object identifier to identify the first graphical object and/or extract the first graphical object from the content database. Alternatively and/or additionally, the first video may be a real-time video (e.g., live-streaming video). For example, the first request may comprise a link and/or one or more resources associated with access to the first video. For example, the first video may be received (and/or streamed) via a connection to a camera filming the first video and/or via a connection to a server associated with the first video.

In some examples, the first graphical object (e.g., a planar graphical object) may be one or more of a two-dimensional image, a three-dimensional image, a three-dimensional object, a second video, a two-dimensional animation, a three-dimensional animation, etc. Alternatively and/or additionally, the first graphical object may correspond to a logo of the entity. Alternatively and/or additionally, the first graphical object may correspond to content for promoting awareness of one or more of the entity, one or more products associated with the entity (e.g., one or more products that the entity may manufacture and/or sell), one or more services associated with the entity (e.g., one or more services that the entity may provide), one or more topics (e.g., topics associated with current events, art, science, etc.) that the entity may want to promote awareness of, etc. In an example, the entity may be a company "JJ's" and/or the entity may provide insurance services. The first graphical object may comprise the logo of the entity and/or text (e.g., graphical text) comprising "JJ's Insurance Services for You". Alternatively and/or additionally, the first graphical object may be visual art and/or a special effect that the entity (e.g., an artist, a graphics designer, etc.) may want to include in the first video.

At 404, a first set of coordinates of a first video frame of the first video may be determined for projection of the first graphical object. In some examples, the first video frame may be comprised within a first plurality of video frames of the first video. For example, the first plurality of video frames may be extracted from the first video. In some examples, the first set of coordinates may correspond to a set of vertices associated with the first graphical object. For example, the first set of coordinates may correspond to a projection region for projection of the first graphical object. Alternatively and/or additionally, the first set of coordinates may correspond to a set of corners of the projection region.

In some examples, the first set of coordinates may be associated with a first surface (e.g., a planar surface) visually represented within the first video frame. In some examples, the first surface may be a flat surface. For example, the first surface may correspond to one or more of a surface of a wall, a surface of a floor, a surface of a table, a surface of an object, a surface of a box, a surface of a step in a set of stairs, etc. Alternatively and/or additionally, the first surface may not be a flat surface. For example, the first surface may correspond to one or more of a surface of a sphere-like object, a surface of a dome, a surface of a cup, etc.

In some examples, the first request to generate the first augmented video may be indicative of first video frame and/or the first set of coordinates. For example, a graphical user interface of the client device may be controlled to display a coordinate selection interface of the video interface. The first plurality of video frames may be accessed and/or displayed via the coordinate selection interface. Alternatively and/or additionally, the first plurality of video frames may be scanned and/or viewed (by a user) using the coordinate selection interface. The first video frame may be selected from the first plurality of video frames via the coordinate selection interface. Alternatively and/or additionally, the first set of coordinates may be selected via the coordinate selection interface.

Figure 5A:
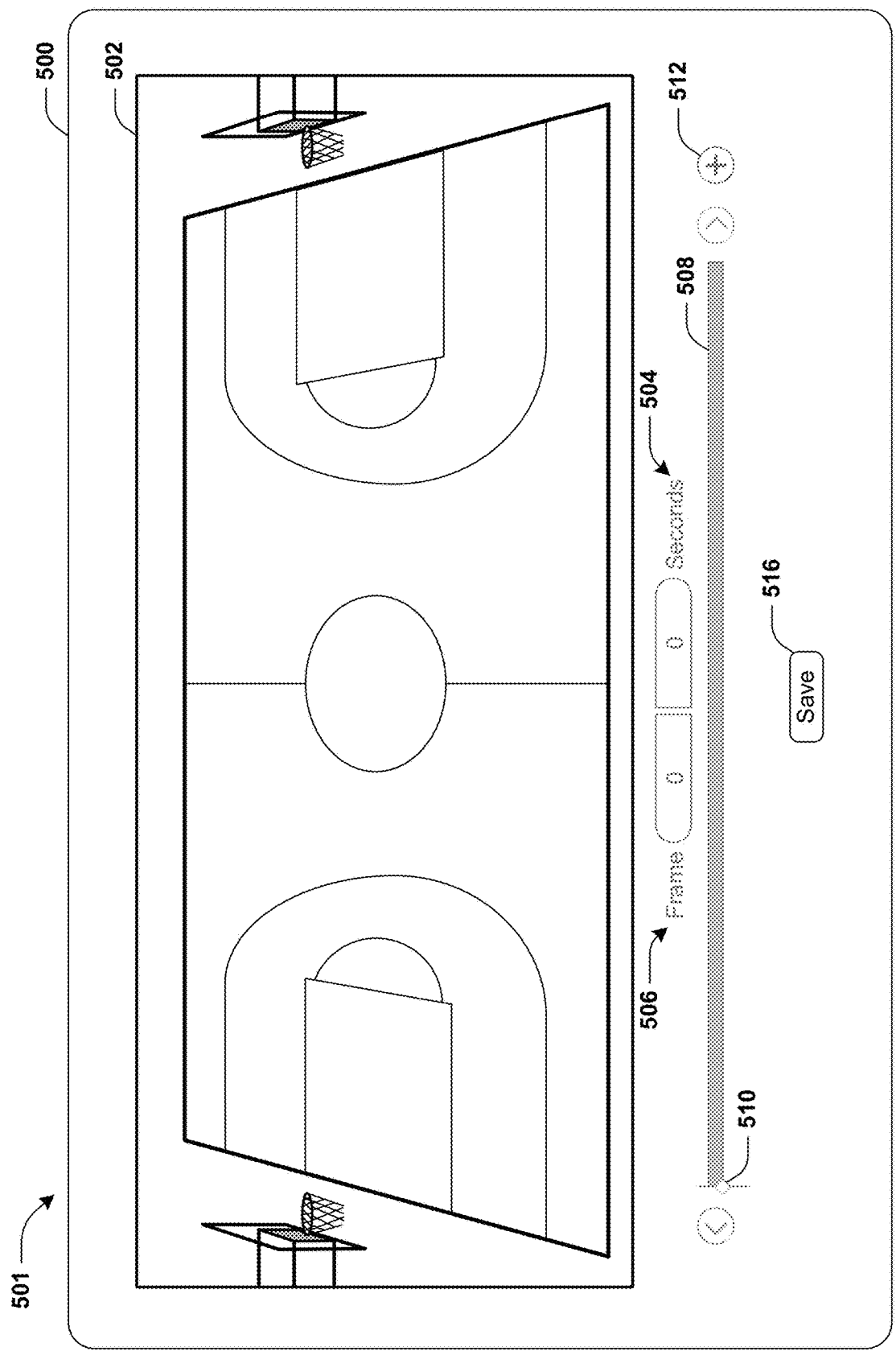
FIG. 5A is a component block diagram illustrating an example system for generating augmented videos, where a first graphical user interface of a first client device is controlled to display a coordinate selection interface of a video interface.

FIGS. 5A-5I illustrate examples of a system 501 for generating augmented videos described with respect to the example method 400 of FIG. 4. FIG. 5A illustrates a first graphical user interface of a first client device 500 (e.g., the client device) being controlled to display the coordinate selection interface of the video interface. In some examples, the coordinate selection interface may display a display area 502 configured to display a video frame of the first plurality of video frames of the first video. For example, the display area 502 may display an initial video frame of the first plurality of video frames.

The coordinate selection interface may display a frame identifier 506 configured to display an indication of a frame number of a video frame being displayed by the display area 502 (e.g., in an instance where the display area 502 displays the initial video frame, the frame identifier 506 may be indicative of frame number 0). Alternatively and/or additionally, the coordinate selection interface may display a time identifier 504 configured to display an indication of a time of the first video corresponding to a video frame being displayed by the display area 502 (e.g., during the instance where the display area 502 displays the initial video frame, the second identifier 504 may be indicative of 0 seconds). In some examples, the display area 502 may be controlled via a slider 508. Responsive to a change in position of an indicator 510 of the slider 508, the display area 502 may display a video frame of the first plurality of video frames based upon the indicator 510. For example, a position of the indicator 510 may be changed to a position associated with the first video frame.

Figure 5B:
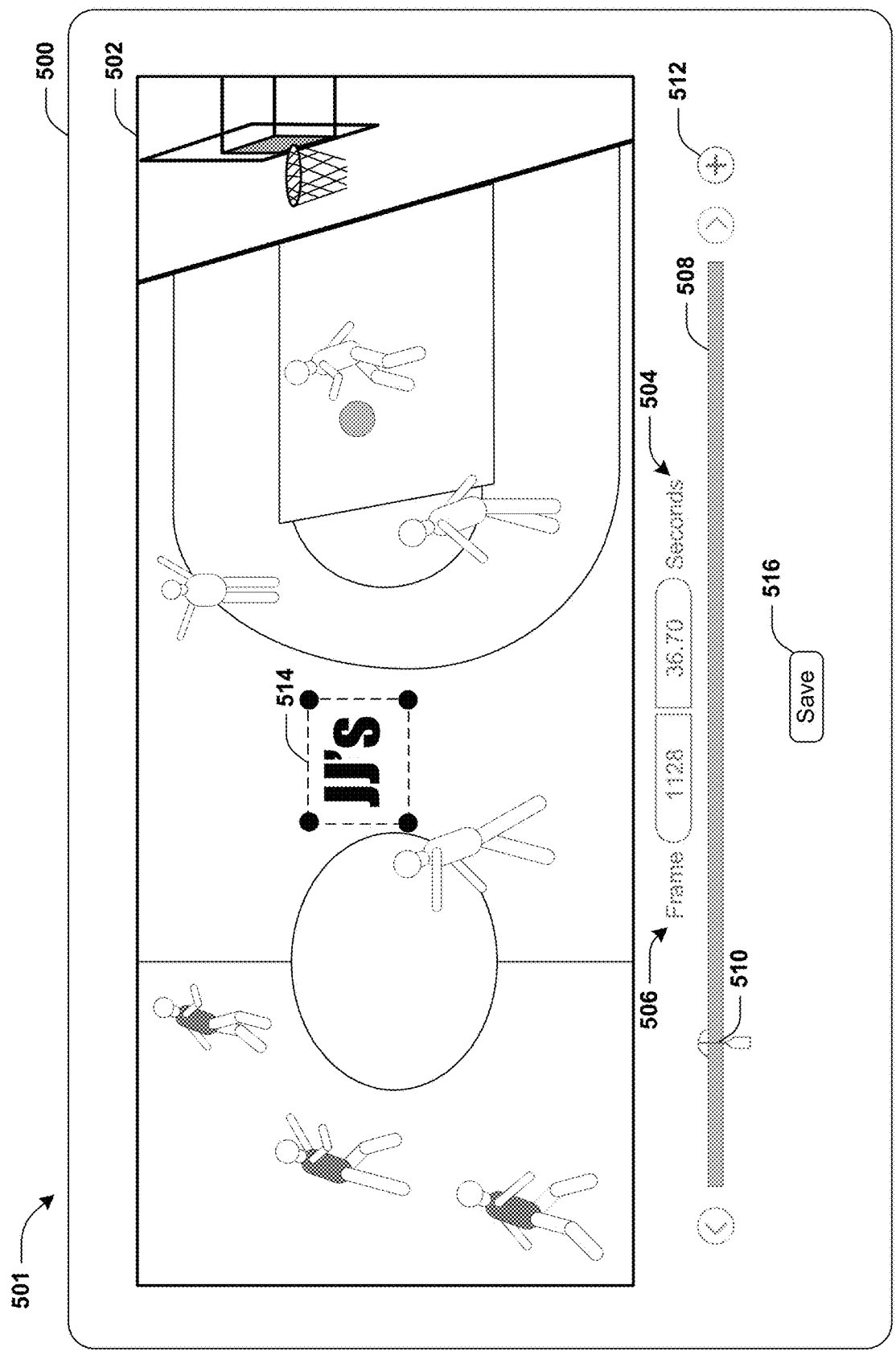
FIG. 5B is a component block diagram illustrating an example system for generating augmented videos, where a display area of a coordinate selection interface displays a first video frame.

FIG. 5B illustrates the display area 502 of the coordinate selection interface displaying the first video frame. In some examples, a first selectable input 512 may correspond to producing the first set of coordinates within the first video frame. For example, responsive to a selection of the first selectable input 512, a modifiable shape 514 corresponding to positioning the first graphical object may be displayed. For example, the modifiable shape 514 may be moved within the first video frame to a desired location (e.g., by dragging the modifiable shape 514 using a touchscreen, a mouse, etc.). Alternatively and/or additionally, vertices of the modifiable shape 514 may be moved (e.g., adjusted) within the first video frame to desired locations. For example, the vertices of the modifiable shape 514 may correspond to the first set of coordinates.

Figure 5C:
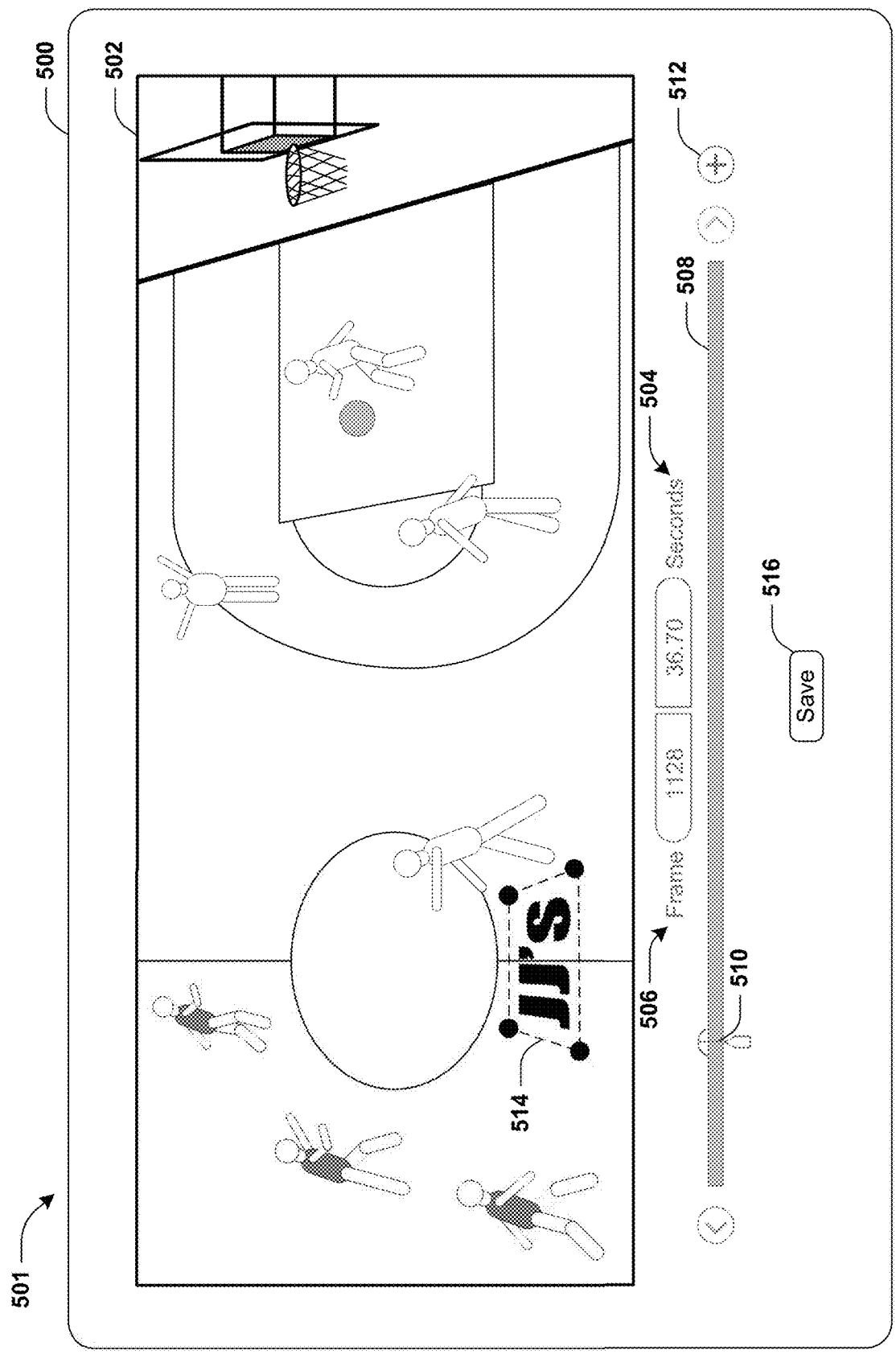
FIG. 5C is a component block diagram illustrating an example system for generating augmented videos, where a modifiable shape and/or vertices of the modifiable shape are adjusted such that the modifiable shape is projected onto a first surface.

FIG. 5C illustrates the modifiable shape 514 and/or the vertices of the modifiable shape 514 being adjusted such that the modifiable shape 514 is projected onto the first surface (e.g., a section of a basketball court). In some examples, responsive to a selection of a second selectable input 516 of the coordinate selection interface, the first set of coordinates may be determined based upon the modifiable shape 514 and/or the vertices of the modifiable shape 514. Alternatively and/or additionally, responsive to the selection of the second selectable input 516, the first set of coordinates may be saved (e.g., stored in memory) and/or included in the first request to generate the first augmented video. Alternatively and/or additionally, responsive to the selection of the second selectable input 516, the first request (comprising the first set of coordinates) may be received from the first client device 500.

In some examples, the first set of coordinates may be determined automatically (by the video augmentation system). For example, the first set of coordinates may be determined (and/or generated) using one or more of one or more computer vision techniques, one or more image processing techniques, etc. For example, the first video frame (and/or the first plurality of video frames) may be analyzed (using one or more surface detection techniques) based upon one or more surface characteristics to detect one or more surfaces within the first video frame. For example, the one or more surface characteristics may correspond to one or more of a type of surface (e.g., one or more of a surface of a wall, a surface of a floor, a surface of a table, a surface of an object, a surface of a box, a surface of a step in a set of stairs, etc.) associated with the first surface, whether the first surface is flat, a position of the first surface with respect to the first video frame, etc.

Alternatively and/or additionally, the first video frame may be analyzed using one or more object detection techniques to detect an object associated with the one or more surface characteristics (e.g., the object may correspond to a wall, a box, a step in a set of stairs, etc.). Responsive to detecting the object, the object may be analyzed to identify the first surface. For example, the first surface may be a part of the object and/or adjacent to the object. In some examples, the first request to generate the first augmented video may be indicative of the one or more surface characteristics.

In an example, the first request may be indicative of the first surface corresponding to a surface of a table. For example, the first plurality of video frames may be analyzed to identify that the first video frame comprises an object corresponding to a table. The object (e.g., the table) may be analyzed to identify the first surface. For example, the first surface may correspond to one or more of a top part of the table, a side of the table, etc.

In some examples, the first surface and/or the first video frame may be analyzed to identify surface edges and/or surface lines (e.g., straight lines) associated with the first surface. In some examples, the surface edges and/or the surface lines may be indicative of boundaries of the first surface. In some examples, the surface edges and/or the surface lines may be identified using one or more edge detection techniques and/or one or more line detection techniques. For example, the first video frame (and/or a first version of the first video frame) may be received by (and/or input to) one or more algorithms associated with the one or more edge detection techniques and/or the one or more line detection techniques, such as an algorithm associated with one or more of Canny Edge Detection, Hough Line Detection and/or a different type of algorithm. The one or more algorithms may be configured to generate and/or output (indications of) the surface edges and/or the surface lines. The surface edges and/or the surface lines may be analyzed to identify surface vertices associated with the first surface (e.g., the surface vertices may correspond to corners of the first surface). In some examples, the surface vertices may be identified by detecting intersections of edges of the surface edges and/or intersections of lines of the surface lines. In some examples, the first set of coordinates may be determined based upon the surface vertices. For example, a coordinate of the first set of coordinates may correspond to a vertex of the surface vertices (e.g., the coordinate may correspond to a position of the vertex).

Alternatively and/or additionally, the first set of coordinates may be determined based upon the surface vertices and/or one or more graphical object positioning characteristics. For example, the one or more graphical object positioning characteristics may be indicative of one or more of a size of the first graphical object with respect to the first video frame (and/or with respect to other video frames of the plurality of video frames), a positioning of the first graphical object with respect to the first surface (e.g., whether the first graphical object should be positioned at a center of the first surface in association with a center point of the first surface, whether the first graphical object should be positioned on a side of the first surface with respect to the center point of the first surface, etc.), etc. In some examples, the first request to generate the first augmented video may be indicative of the one or more graphical object positioning characteristics.

At 406, the first graphical object may be projected onto the first video frame based upon the first set of coordinates. In some examples, the first graphical object may be projected onto the first surface (based upon the first set of coordinates). Alternatively and/or additionally, the first graphical object may be projected onto a first section of the first surface associated with the first set of coordinates. In some examples, the first set of coordinates may correspond to a set of corners of the first graphical object, with respect to the first video frame. For example, the first graphical object may be projected onto the first video frame such that the first graphical object is within the first set of coordinates and/or (overlaid) on the first set of coordinates. In some examples, a first augmented video frame comprising a representation (e.g., a projection) of the first graphical object may be generated.

Alternatively and/or additionally, a first representation of the first graphical object may be generated based upon the first set of coordinates. In some examples, a first size of the first representation of the first graphical object, a first shape of the first representation of the first graphical object and/or a first angle of the first representation of the first graphical object with respect to the first video frame may be determined based upon the first set of coordinates. For example, the first representation of the first graphical object may be generated based upon the first size, the first shape and/or the first angle. Alternatively and/or additionally, the first representation of the first graphical object may be projected onto the first video frame based upon the first set of coordinates.

Figure 5D:
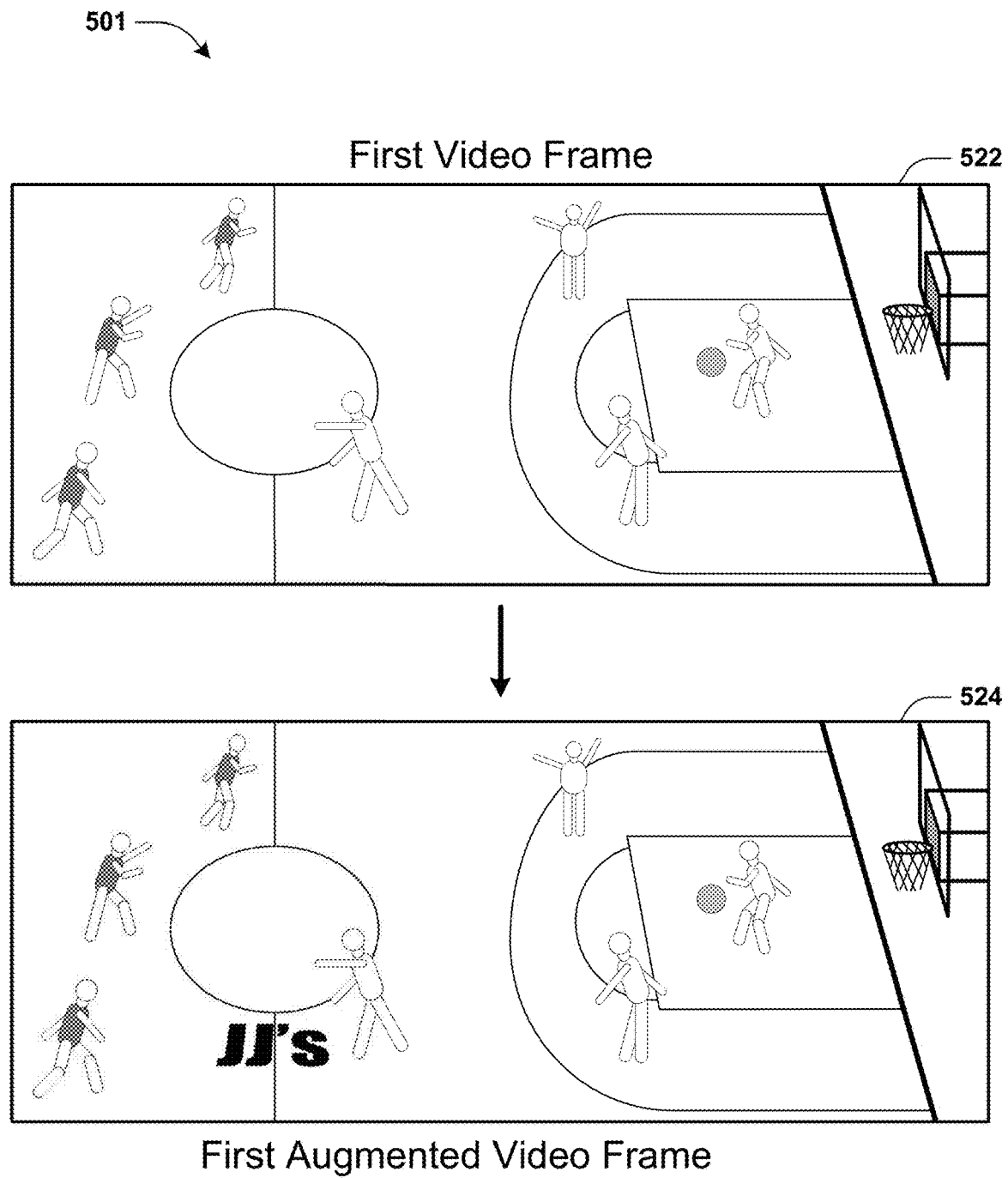
FIG. 5D is a component block diagram illustrating an example system for generating augmented videos, where a first graphical object is projected onto a first video frame.

FIG. 5D illustrates an example of the first graphical object being projected onto the first video frame. A representation 522 of FIG. 5D is an example of the first video frame of the first plurality of video frames of the first video (e.g., the representation 522 does not comprise a representation of the first graphical object). Alternatively and/or additionally, the first graphical object may be projected onto the first section of the first surface to generate the first augmented video frame associated with the first video frame. A representation 524 of FIG. 5D is an example of the first augmented video frame.

At 408, a first set of objects (e.g., a set of one or more objects) within the first video frame may be determined. The first set of objects may be determined by performing one or more image processing techniques and/or one or more computer vision techniques on the first video frame. For example, the first video frame (and/or one or more other video frames of the first plurality of video frames) may be analyzed using one or more object detection techniques (and/or one or more object segmentation techniques) to detect the first set of objects. Alternatively and/or additionally, the first video frame may be analyzed using one or more machine learning techniques to detect the first set of objects. For example, the first set of objects may correspond to one or more of one or more moving objects, one or more people, one or more balls, one or more sports players, one or more bicycles, etc. Alternatively and/or additionally, the first set of objects may comprise one or more unstable objects. An unstable object of the one or more unstable objects may have one or more characteristics (e.g., one or more of shape, form, size, position, etc.) that differ and/or change between video frames of the video.

In some examples, the first video frame (and/or one or more other video frames of the first plurality of video frames) may be analyzed to detect the first set of objects based upon one or more object settings. For example, the one or more object settings may be indicative of detecting one or more objects that move (e.g., detecting the one or more objects that move may be performed by analyzing merely the first video frame and/or by analyzing the first video frame and one or more other video frames of the first plurality of video frames).

Alternatively and/or additionally, the one or more object settings may be indicative of one or more types of objects to detect (and/or to include in the first set of objects) (e.g., object categories). For example, the one or more object settings may be indicative of one or more types of objects, such as one or more of a person, a news anchor, a sports player (e.g., a basketball player, a baseball player, etc.), a ball (e.g., a tennis ball, a basketball, etc.), a bicycle, a real-world object, a cup, a glove, food, etc.

In some examples, the one or more object settings may be determined based upon a context of the first video. The context of the first video may correspond to one or more of a news segment, a talk show, a sports game (e.g., a baseball game, a basketball game, a volleyball game, a tennis game, etc.), a movie, a TV show, an entertainment video, a promotional video (e.g., an advertisement video), an educational video, etc. In an example where the first video is associated with a basketball game, the one or more types of objects to be detected (and/or to be included in the first set of objects if detected) may correspond to one or more of a sports player, an audience member, a referee, a basketball, etc. Alternatively and/or additionally, in the example where the first video is associated with the basketball game, the one or more types of objects to be detected (and/or included in the first set of objects if detected) may correspond to a person (e.g., which incorporates the sports player, the audience member and/or the referee into a single type of object), a ball (e.g., which includes the basketball), etc. Alternatively and/or additionally, in the example where the first video is associated with the basketball game, the first set of objects may comprise one or more of one or more sports players, one or more audience members, one or more referees, one or more people, one or more basketballs, etc.

In some examples, the one or more object settings and/or the context of the first video may be determined based upon the first request. For example, the first request may be indicative of the one or more object settings and/or the context of the first video. Alternatively and/or additionally, the context of the first video may be determined based upon the first video (and/or the one or more object settings may be determined based upon the context). For example, the first video (and/or one or more video frames of the first video frame) and/or metadata (e.g., title, description, category, etc. of the first video) may be analyzed to (automatically) determine the context of the first video. In an example, it may be determined that the first video is associated with a talk show and/or a news segment responsive to identifying a table and/or one or more people behind the table within the first video and/or the one or more video frames. In another example, it may be determined that the first video is associated with a soccer game responsive to identifying a grass field (and/or a green field) and/or one or more goals within the first video and/or the one or more video frames. In another example, it may be determined that the first video is associated with a basketball game responsive to identifying a basketball court, a basketball and/or a basketball hoop within the first video and/or the one or more video frames.

Alternatively and/or additionally, the first video frame (and/or one or more video frames of the first plurality of video frames different than the first video frame) may be analyzed to detect the first set of objects based upon one or more object datasets. For example, an object dataset of the one or more object datasets may correspond to a type of object of the one or more types of object. An object dataset may comprise information associated with a type of object, such as an appearance of objects corresponding to the type of object, one or more parameters associated with objects corresponding to the type of object, colors associated with objects corresponding to the type of object, measurements associated with objects corresponding to the type of object, etc.

In some examples, the first set of objects may be determined and/or detected using one or more object segmentation techniques and/or one or more image segmentation techniques. For example, the first video frame may be segmented into multiple segments using the one or more object segmentation techniques and/or the one or more image segmentation techniques. The first video frame may be segmented into the multiple segments based upon one or more of color differences between portions of the first video frame, detected boundaries associated with the multiple segments, etc. In some examples, a segment of the multiple segments may be analyzed to determine an object associated with the segment. For example, an object of the first set of objects may be detected by comparing a segment of the multiple segments with the one or more object datasets to determine whether the segment matches a type of object of the one or more object datasets. In some examples, the one or more object datasets may be retrieved from an object information database. For example, the object information database may be analyzed based upon the one or more object settings and/or the context of the first video to identify the one or more object datasets and/or retrieve the one or more object datasets from the object information database.

At 410, a first plurality of keypoints (e.g., corresponding points) on the first video frame may be determined based upon the first set of objects. In some examples, the first plurality of keypoints may be determined using one or more computer vision techniques, one or more image processing techniques and/or one or more corner detection techniques (e.g., Shi-Tomasi Corner Detector). In some examples, the first plurality of keypoints may be used for determining one or more relationships between the first video frame and one or more other video frames of the first plurality of video frames.

In some examples, the first plurality of keypoints may be determined by analyzing the first video frame to detect corners and/or interest points within the first video frame. A corner of the corners may correspond to one or more of an intersection of two or more edges comprised within the first video frame, a point of the first video frame for which there are two or more dominant and/or different edge directions in a local neighborhood of the point, etc. Alternatively and/or additionally, an interest point of the interest points may correspond to a point in the first video frame that has a defined position, such as one or more of an isolated point of local intensity, a point on a curve where a curvature is locally maximal (and/or minimal), a line ending, etc. The first plurality of keypoints may be determined based upon the corners and/or the interest points within the first video frame. For example, a keypoint of the first plurality of keypoints may correspond to a corner of the corners (and/or the keypoint may correspond to a position of the corner). Alternatively and/or additionally, a keypoint of the first plurality of keypoints may correspond to an interest point of the interest points (and/or the keypoint may correspond to a position of the interest point).

In some examples, keypoints of the first plurality of keypoints may not correspond to the first set of objects. For example, the first plurality of keypoints may not intersect with the first set of objects. Alternatively and/or additionally, a position of a keypoint of the first plurality of keypoints with respect to the first video frame (and/or a position of each keypoint of the first plurality of keypoints) may not correspond to and/or may not intersect with an object of the first set of objects.

Alternatively and/or additionally, keypoints of the first plurality of keypoints may not correspond to the one or more moving objects of the first set of objects. For example, the first plurality of keypoints may not intersect with the one or more moving objects of the first set of objects. Alternatively and/or additionally, a position of a keypoint of the first plurality of keypoints with respect to the first video frame (and/or a position of each keypoint of the first plurality of keypoints) may not correspond to and/or may not intersect with an object of the one or more moving objects. In some examples, a moving object of the one or more moving objects may correspond to an object of the first set of objects having a positional change between two or more video frames of the first plurality of video frames.

In some examples, the first plurality of keypoints may be determined based upon a second plurality of keypoints. For example, the second plurality of keypoints may be determined using one or more computer vision techniques, one or more image processing techniques and/or one or more corner detection techniques. For example, the first video frame may be received by (and/or input to) an algorithm associated with the one or more computer vision techniques, the one or more image processing techniques and/or the one or more corner detection techniques, such as one or more of Shi-Tomasi Corner Detector, Harris Corner Detector, a different algorithm, etc. The algorithm may be configured to detect second corners and/or second interest points within the first video frame. The algorithm may be configured to generate and/or output the second plurality of keypoints based upon the second corners and/or the second interest points within the first video frame. For example, a keypoint of the second plurality of keypoints may correspond to a corner of the second corners (and/or the keypoint may correspond to a position of the corner). Alternatively and/or additionally, a keypoint of the second plurality of keypoints may correspond to an interest point of the second interest points (and/or the keypoint may correspond to a position of the corner).

In some examples, one or more intersecting keypoints of the second plurality of keypoints may be determined based upon the first set of objects and/or the second plurality of keypoints. The one or more intersecting keypoints may intersect with the first set of objects and/or the one or more moving objects of the first set of objects. A keypoint of the one or more intersecting keypoints may correspond to a corner of an object of the first set of objects and/or the one or more moving objects (e.g., the corner may be located on the object). Alternatively and/or additionally, a keypoint of the one or more intersecting keypoints may correspond to an interest point of an object of the first set of objects and/or the one or more moving objects (e.g., the interest point may be located on the object). In some examples, the second plurality of keypoints may be compared with the first set of objects to determine the one or more intersecting keypoints that intersect with the first set of objects (e.g., the second plurality of keypoints may be compared with positions and/or locations associated with the first set of objects to determine the one or more intersecting keypoints). Alternatively and/or additionally, the second plurality of keypoints may be compared with merely the one or more moving objects of the first set of objects to determine the one or more intersecting keypoints that intersect with the one or more moving objects. In some examples, the one or more intersecting keypoints may be removed from the second plurality of keypoints to determine the first plurality of keypoints (e.g., the first plurality of keypoints may comprise keypoints of the second plurality of keypoints excluding the one or more intersecting keypoints).

In some examples, a first object mask may be generated based upon the first set of objects and/or the one or more moving objects of the first set of objects. The first object mask may be representative of regions and/or pixels of the first video frame that are occupied by the first set of objects and/or the one or more moving objects. Alternatively and/or additionally, the first object mask may be representative of boundaries associated with regions and/or pixels of the first video frame that are occupied by the first set of objects and/or the one or more moving objects. In some examples, the first object mask may be generated using one or more computer vision techniques, one or more image processing techniques, one or more neural network techniques and/or one or more machine learning techniques. For example, the first set of objects, the one or more moving objects and/or the first video frame may be received by (and/or input to) an algorithm associated with the one or more computer vision techniques, the one or more image processing techniques, the one or more neural network techniques and/or the one or more machine learning techniques, such as Mask region-convolutional neural network (Mask R-CNN) and/or a different algorithm. The algorithm may be configured to generate and/or output the first object mask based upon the first set of objects, the one or more moving objects and/or the first video frame.

In some examples, the first object mask may be compared with the second plurality of keypoints. It may be determined that the one or more intersecting keypoints are within the regions and/or the pixels of the first object mask that are occupied by the first set of objects and/or the one or more moving objects. Responsive to determining that the one or more intersecting keypoints are within the regions and/or the pixels of the first object mask that are occupied by the first set of objects and/or the one or more moving objects, the one or more intersecting keypoints may be removed from the second plurality of keypoints to determine the first plurality of keypoints.

Figure 5E:
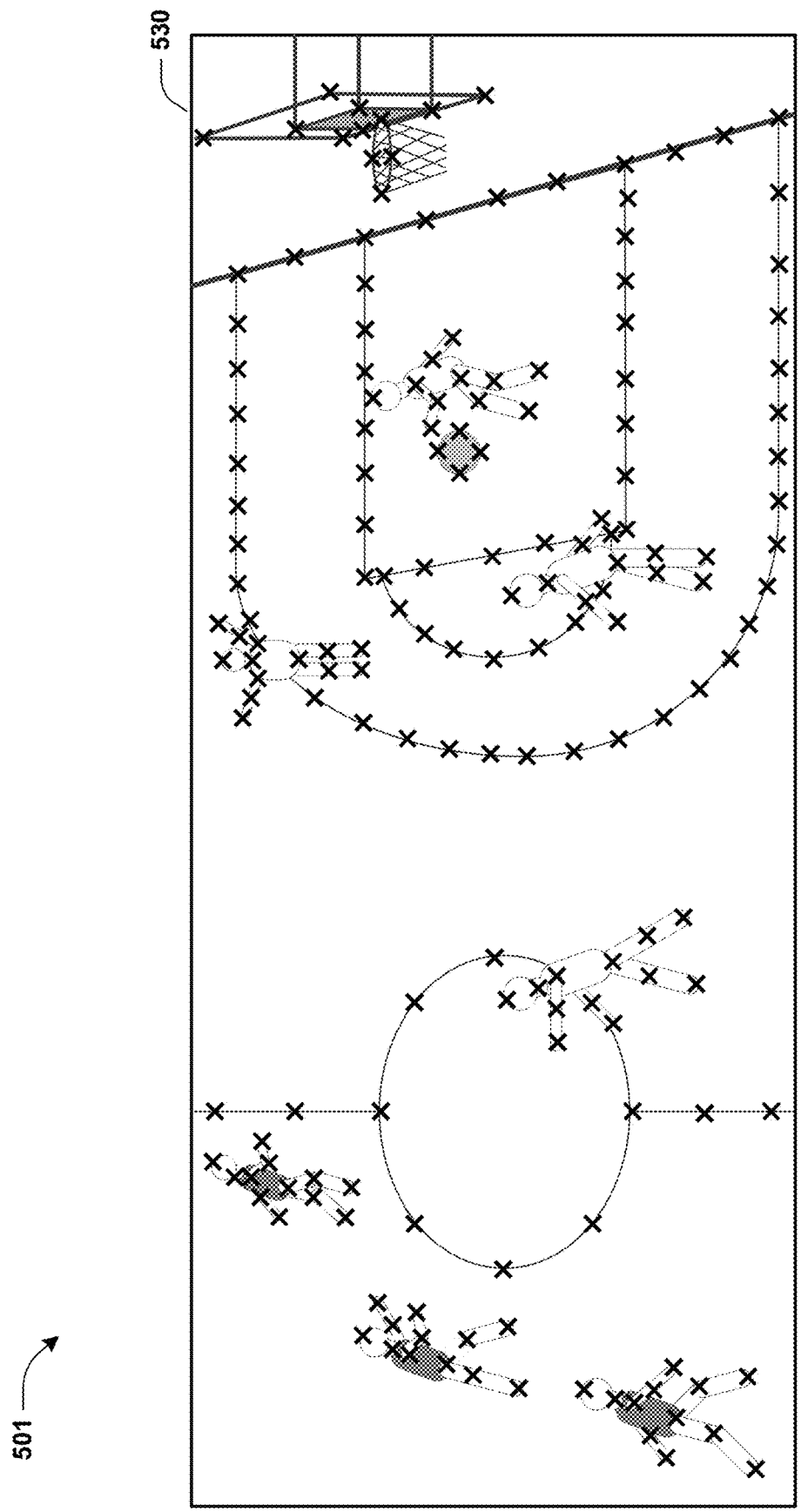
FIG. 5E is a component block diagram illustrating an example system for generating augmented videos, where a first plurality of keypoints is determined based upon a first set of objects, one or more moving objects, a first object mask and/or a second plurality of keypoints.
Figure 5F:
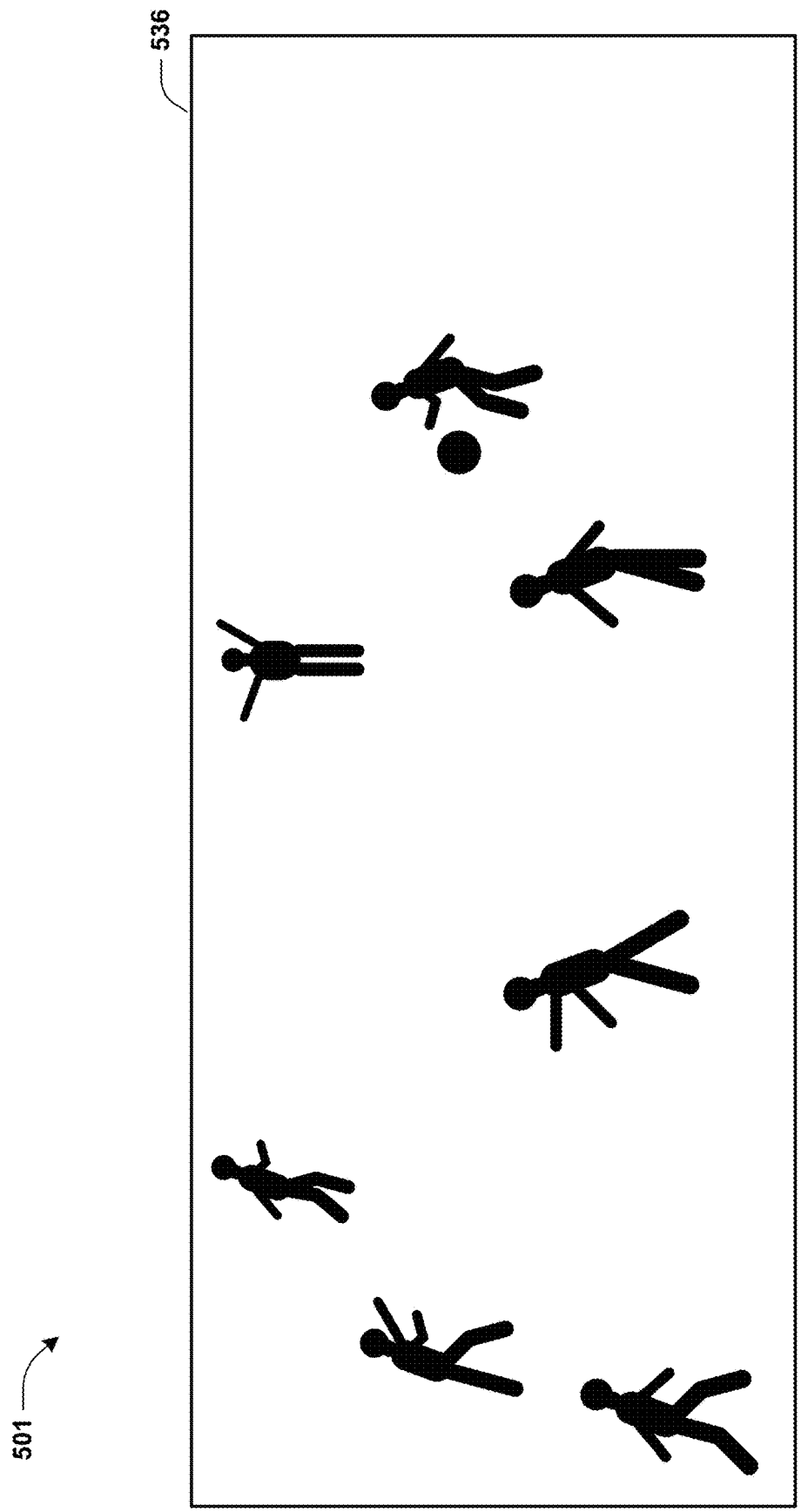
FIG. 5F is a component block diagram illustrating an example system for generating augmented videos, where a first plurality of keypoints is determined based upon a first set of objects, one or more moving objects, a first object mask and/or a second plurality of keypoints.
Figure 5G:
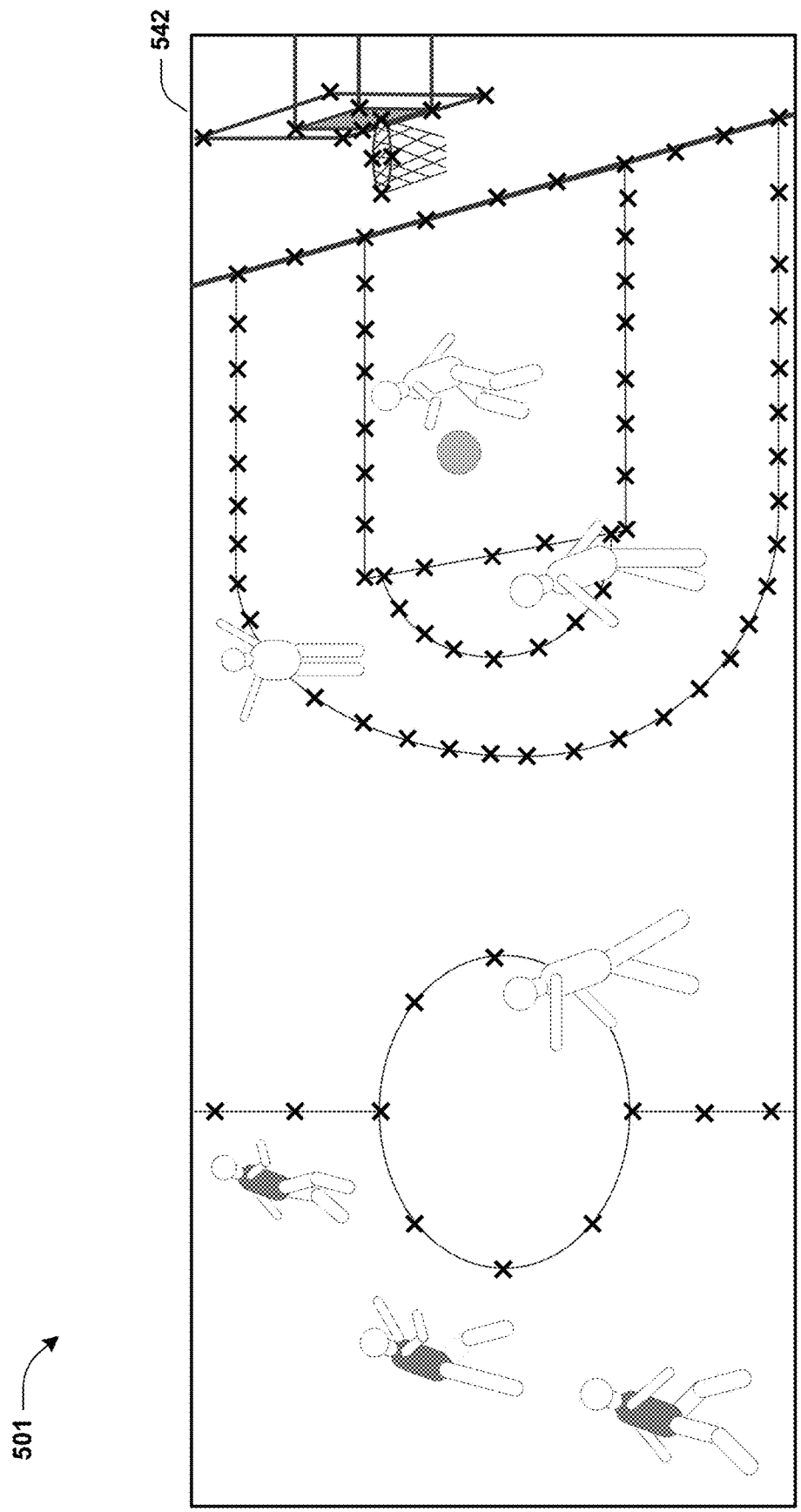
FIG. 5G is a component block diagram illustrating an example system for generating augmented videos, where a first plurality of keypoints is determined based upon a first set of objects, one or more moving objects, a first object mask and/or a second plurality of keypoints.

FIGS. 5E-5G illustrates an example of the first plurality of keypoints being determined based upon the first set of objects, the one or more moving objects, the first object mask and/or the second plurality of keypoints. A representation 530 of FIG. 5E is an example of the second plurality of keypoints on the first video frame. For example, keypoints of the second plurality of keypoints may correspond to lines of the basketball court, curves of the basketball court, edges of lines of the basketball court, lines and/or edges of a basketball hoop, etc. Alternatively and/or additionally, the second plurality of keypoints may comprise a plurality of intersecting keypoints. Keypoints of the plurality of intersecting keypoints correspond to and/or intersect with objects of the first set of objects and/or the one or more moving objects.

A representation 536 of FIG. 5F is an example of the first object mask generated based upon the first set of objects and/or the one or more moving objects. For example, the first object mask is representative of regions and/or pixels of the first video frame that are occupied by the first set of objects and/or the one or more moving objects. For example, the first set of objects and/or the one or more moving objects may correspond to basketball players playing basketball and/or a basketball. For example, the first set of objects and/or the one or more moving objects may be determined by analyzing the first video frame. For example, the first video frame may be analyzed based upon the context of the first video (e.g., basketball game) to determine the first set of objects.

A representation 542 of FIG. 5G is an example of the first plurality of keypoints on the first video frame (the first plurality of keypoints excludes the plurality of intersecting keypoints). For example, the first object mask may be compared with the second plurality of keypoints. The plurality of intersecting keypoints may be determined based upon a comparison of the second plurality of keypoints and the first object mask. The plurality of intersecting keypoints may be removed from the second plurality of keypoints to determine the first plurality of keypoints.

Alternatively and/or additionally, rather than determining the second plurality of keypoints and/or removing the one or more intersecting keypoints based upon the first set of objects and/or the one or more moving objects to determine the first plurality of keypoints, the first plurality of keypoints may be determined by analyzing the first video frame, based upon the first set of objects and/or the one or more moving objects, to detect keypoints (e.g., the first plurality of keypoints) that do not intersect with the first set of objects and/or the one or more moving objects. For example, merely first portions of the first video frame that do not correspond to the first set of objects and/or the one or more moving objects may be analyzed to determine the first plurality of keypoints. Alternatively and/or additionally, the first object mask may be applied to the first video frame to determine the first portions of the first video frame that do not correspond to the first set of objects and/or the one or more moving objects.

At 412, a third plurality of keypoints on a second video frame of the first plurality of video frames may be determined. In some examples, the third plurality of keypoints may be associated with the first plurality of keypoints (on the first video frame). For example, a keypoint of the third plurality of keypoints may correspond to a keypoint of the first plurality of keypoints.

In some examples, the second video frame may be contiguous to the first video frame. For example, one or more video frames of the first plurality of video frames may not be between the first video frame and the second video frame with respect to an order (e.g., a sequential order) of video frames of the first plurality of video frames and/or the first video. Alternatively and/or additionally, the second video frame may (directly) follow (e.g., succeed) the first video frame with respect to the order of video frames of the first plurality of video frames. For example, the first video frame may correspond to frame number n of the first plurality of video frames and/or the second video frame may correspond to frame number n+1 of the first plurality of video frames. Alternatively and/or additionally, the second video frame may (directly) precede the first video frame with respect to the order of video frames of the first plurality of video frames. For example, the first video frame may correspond to frame number n and/or the second video frame may correspond to frame number n−1 of the first plurality of video frames (e.g., if the first video frame corresponds to frame number 324, then the second video frame may correspond to frame number 325 if the second video frame follows the first video frame and/or the second video frame may correspond to frame number 323 if the second video frame precedes the first video frame).

In some examples, the third plurality of keypoints may be determined using one or more computer vision techniques, one or more image processing techniques and/or one or more corner detection techniques (e.g., Shi-Tomasi Corner Detector, Harris Corner Detector, etc.). Alternatively and/or additionally, a second set of objects (e.g., a set of one or more objects) within the second video frame may be determined. In some examples, the second set of objects may be determined based upon the first set of objects (e.g., one or more objects of the first set of objects in the first video frame may be tracked to the second video frame). Alternatively and/or additionally, the second set of objects may be determined by performing one or more image processing techniques and/or one or more computer vision techniques on the second video frame. Alternatively and/or additionally, the second set of objects may be determined based upon the one or more object settings and/or the one or more object datasets. Alternatively and/or additionally, keypoints of the third plurality of keypoints may not intersect with and/or may not correspond to the second set of objects.

Alternatively and/or additionally, the third plurality of keypoints may be determined based upon the first plurality of keypoints. For example, the third plurality of keypoints may be determined using one or more optical flow techniques and/or one or more scale-invariant keypoints techniques. For example, the first video frame, the first plurality of keypoints and/or the second video frame may be received by (and/or input to) one or more algorithms associated with the one or more optical flow techniques and/or the one or more scale-invariant keypoints techniques, such as an algorithm associated with Lucas-Kanade method, Scale Invariant Feature Transform (SIFT) approach, a different algorithm, etc. to generate and/or output the third plurality of keypoints based upon the first video frame, the first plurality of keypoints and/or the second video frame.

In some examples, a first set of keypoints of the first plurality of keypoints (associated with the first video frame) may correspond to a second set of keypoints of the third plurality of keypoints (associated with the second video frame). In some examples, the first set of keypoints may be tracked to the second set of keypoints on the second video frame (using one or more optical flow tracking techniques, for example). In some examples, a keypoint of the second set of keypoints may correspond to a keypoint of the first set of keypoints. Alternatively and/or additionally, each keypoint of the second set of keypoints may correspond to a keypoint of the first set of keypoints.

A first keypoint of the first set of keypoints and a second keypoint of the second set of keypoints may correspond to a pair of keypoints corresponding to a first corresponding point comprised within both the first video frame and the second video frame. For example, the first keypoint on the first video frame and the second keypoint on the second video frame may both correspond to the first corresponding point. The first corresponding point may be a corner and/or an interest point that is comprised within (both) the first video frame and the second video frame. For example, the first keypoint on the first video frame may correspond to one or more first pixels of the first video frame where the first corresponding point is located and/or the second keypoint on the second video frame may correspond to one or more second pixels of the second video frame where the first corresponding point is located.

In some examples, the third plurality of keypoints may be analyzed based upon the first keypoint and/or the first corresponding point to identify the second keypoint from the third plurality of keypoints and/or to determine that the second keypoint corresponds to the first keypoint and/or to the first corresponding point. Alternatively and/or additionally, the first keypoint may be compared with the third plurality of keypoints to determine that the first keypoint corresponds to the second keypoint (e.g., comparing the first keypoint with the third plurality of keypoints may be performed based upon the first corresponding point). For example, it may be determined that the first keypoint and the second keypoint correspond to a pair of keypoints corresponding to the first corresponding point.

In an example, the first corresponding point may correspond to a corner and/or an interest point comprised within (both) the first video frame and the second video frame (e.g., the first corresponding point may correspond to a corner of a scoreboard, a part of a line drawn on a basketball court, a part of a curve drawn on the basketball court, a border of a wooden tile of the basketball court, etc.). Accordingly, the first keypoint of the first set of keypoints and/or the second keypoint of the second set of keypoints may correspond to the (same) corner and/or the (same) interest point. A first position of the first keypoint with respect to the first video frame may be different than a second position of the second keypoint with respect to the second video frame (e.g., a position of the first corresponding point with respect to the first video frame may be different than a position of the first corresponding point with respect to the second video frame). A difference in position between the first position and the second position may be caused by one or more of a shift of a camera during filming of the first video (and/or during filming of the first video frame and/or the second video frame), a rotation of the camera around a center of the camera during filming of the first video (and/or during filming of the first video frame and/or the second video frame), zooming of the camera during filming of the first video (and/or during filming of the first video frame and/or the second video frame), panning associated with the first video frame and the second video frame, etc.

In some examples, the first set of keypoints may be the same as the first plurality of keypoints. Alternatively and/or additionally, the first set of keypoints may be a subset of the first plurality of keypoints. The second set of keypoints may be the same as the third plurality of keypoints. Alternatively and/or additionally, the second set of keypoints may be a subset of the third plurality of keypoints.

At 414, a first relationship between the first video frame and the second video frame may be determined based upon the first plurality of keypoints and/or the second plurality of keypoints. In some examples, the first relationship may correspond to a relationship and/or a transformation between one or more first camera parameters (e.g., one or more of a first camera view, a first camera angle, etc.) associated with the first video frame and one or more second camera parameters (e.g., one or more of a second camera view, a second camera angle, etc.) associated with the second video frame. For example, the first relationship may be associated with one or more of the shift of the camera during filming of the first video (and/or during filming of the first video frame and/or the second video frame), the rotation of the camera around the center of the camera during filming of the first video (and/or during filming of the first video frame and/or the second video frame), the zooming of the camera during filming of the first video (and/or during filming of the first video frame and/or the second video frame), the panning associated with the first video frame and the second video frame, etc.

In some examples, the first set of keypoints within the first video frame and the second set of keypoints within the second video frame may be compared to determine the first relationship. Alternatively and/or additionally, a plurality of pairs of keypoints may be determined based upon the first set of keypoints within the first video frame and the second set of keypoints within the second set of keypoints. In some examples, each pair of keypoints of the plurality of pairs of keypoints may comprise a keypoint of the first set of keypoints and an exemplary keypoint of the second set of keypoints corresponding to the keypoint of the first set of keypoints. For example, an exemplary pair of keypoints of the plurality of pairs of keypoints may comprise a first exemplary keypoint of the first set of keypoints and a second exemplary keypoint of the second set of keypoints corresponding to the first exemplary keypoint of the first set of keypoints. For example, the first exemplary keypoint and the second exemplary keypoint of the exemplary pair of keypoints may correspond to an exemplary corresponding point (e.g., a corner and/or an interest point). In some examples, a quantity of pairs of keypoints of the plurality of pairs of keypoints may be 4. Alternatively and/or additionally, the quantity of pairs of keypoints of the plurality of pairs of keypoints may be greater than 4 (e.g., 100 pairs of keypoints, 1000 pairs of keypoints, etc.). It may be appreciated that by using a higher quantity of pairs of keypoints to determine the first relationship may result in determining the first relationship more accurately.

In some examples, a homography (e.g., a homography transformation) between the first video frame and the second video frame may be determined based upon the plurality of pairs of keypoints. The homography may correspond to the first relationship between the first video frame and the second video frame. Alternatively and/or additionally, a homography data structure (e.g., a homography matrix) may be generated based upon the plurality of pairs of keypoints.

In some examples, the homography data structure relates the first keypoint within the first video frame to the second keypoint within the second video frame. For example, a second keypoint location of the second keypoint within the second video frame may be determined by combining the homography data structure with a first keypoint location of the first keypoint. The first keypoint location may correspond to a position, with respect to the first video frame, of the one or more first pixels where the first corresponding point is located in the first video frame. Alternatively and/or additionally, the second keypoint location may correspond to a position, with respect to the second video frame, of the one or more second pixels where the first corresponding point is located in the second video frame. For example, one or more operations (e.g., mathematical operations) may be performed using the homography data structure and/or the first keypoint location to determine the second keypoint location. Alternatively and/or additionally, one or more operations (e.g., mathematical operations) may be performed using the homography data structure, a horizontal axis coordinate of the first keypoint location and/or a vertical axis coordinate of the first keypoint location to determine the second keypoint location.

Alternatively and/or additionally, the homography data structure relates first points (e.g., one or more of pixels, regions, etc.) of the first video frame to second points of the second video frame, corresponding to the first points. For example, a second point location of a second point of the second points within the second video frame may be determined by combining the homography data structure with a first point location of a first point, corresponding to the second point, within the first video frame. For example, one or more operations (e.g., mathematical operations) may be performed using the homography data structure and/or the first point location to determine the second point location. Alternatively and/or additionally, one or more operations (e.g., mathematical operations) may be performed using the homography data structure, a horizontal axis coordinate of the first point location and/or a vertical axis coordinate of the first point location to determine the second point location.

Figure 5H:
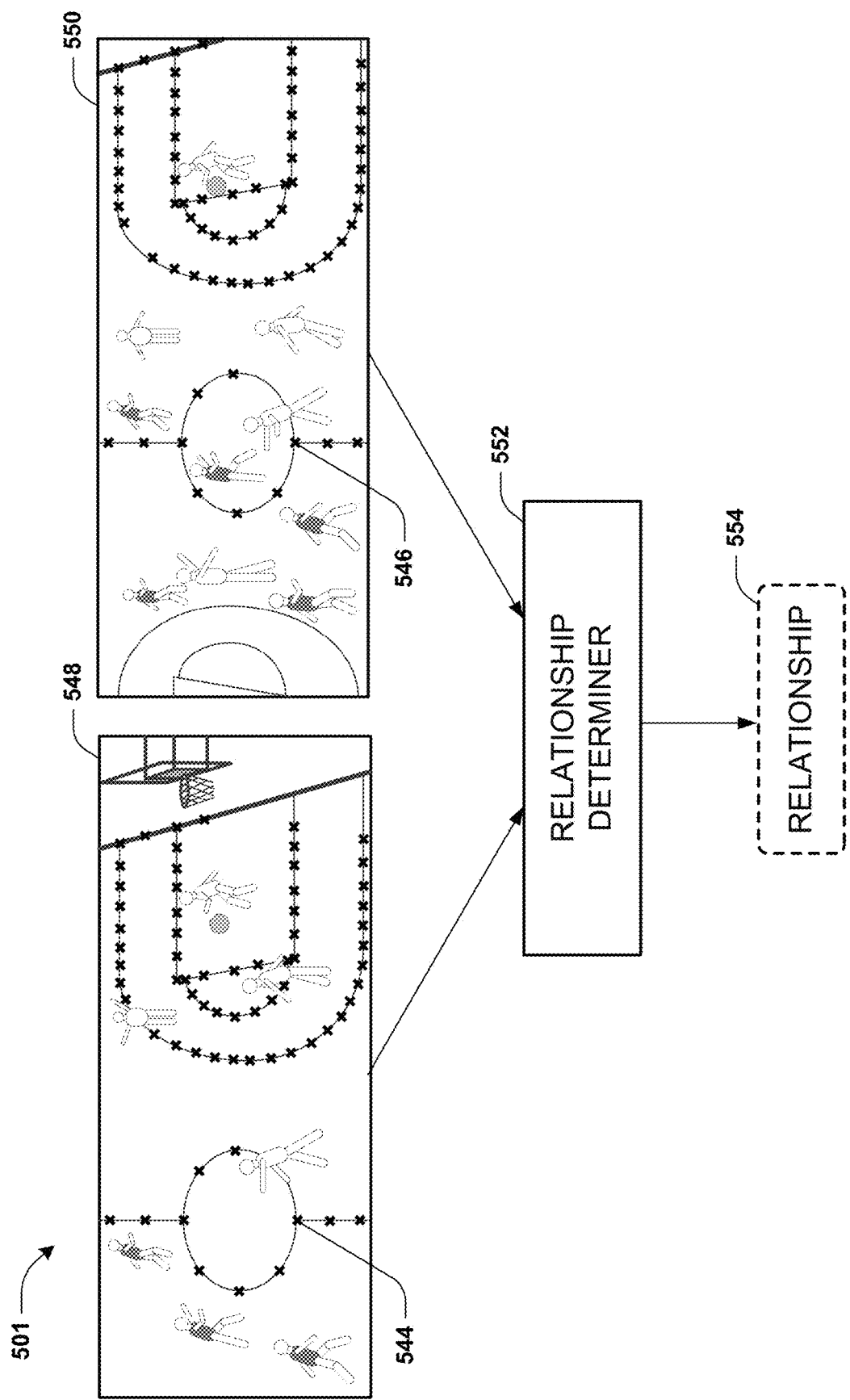
FIG. 5H is a component block diagram illustrating an example system for generating augmented videos, where a relationship is determined based upon a first set of keypoints on a first video frame and/or a second set of keypoints on a second video frame.

FIG. 5H illustrates an example scenario in which a relationship 554 (e.g., the first relationship) is determined based upon the first set of keypoints of the first plurality of keypoints on the first video frame and/or the second set of keypoints of the third plurality of keypoints on the second video frame. A representation 548 is an example of the first set of keypoints on the first video frame. A representation 550 is an example of the second set of keypoints on the second video frame. For example, each keypoint of the first set of keypoints within the representation 548 may correspond to a keypoint of the second set of keypoints within the representation 550 (and/or each keypoint of the second set of keypoints may correspond to a keypoint of the first set of keypoints). A third keypoint 544 of the first set of keypoints on the first video frame may correspond to a fourth keypoint 546 of the second set of keypoints on the second video frame. For example, the third keypoint 544 and the fourth keypoint 546 may be a pair of keypoints corresponding to a second corresponding point. The second corresponding point may correspond to an intersection of a half-court line of the basketball court and a half-court circle of the basketball court. In some examples, a relationship determiner 552 may determine the relationship 554 (e.g., the first relationship) between the first video frame and the second video frame based upon the first set of keypoints and/or the second set of keypoints. For example, the relationship determiner 552 may determine the relationship 554 based upon the plurality of pairs of keypoints. Alternatively and/or additionally, the relationship determiner 552 may generate the homography data structure associated with the relationship 554 based upon the first set of keypoints and/or the second set of keypoints. In some examples, the relationship 554 may be indicative of a rotation of the camera (filming the first video) in a first direction (e.g., the first direction may be leftwards) during filming of the first video frame and/or the second video frame. Alternatively and/or additionally, the relationship 554 may be indicative of panning of the first video in the first direction during the first video frame and/or the second video frame.

At 416, a second set of coordinates of the second video frame may be determined for projection of the first graphical object based upon the first set of coordinates and/or the first relationship between the first video frame and the second video frame. In some examples, the second set of coordinates may be determined using the homography data structure. For example, the homography data structure may be applied to the first set of coordinates to determine the second set of coordinates.

In some examples, the homography data structure relates the first set of coordinates of the first video frame to the second set of coordinates of the second video frame. For example, a second coordinate of the second set of coordinates may be determined by combining the homography data structure with a first coordinate, of the first set of coordinates, corresponding to the second coordinate. For example, one or more operations (e.g., mathematical operations) may be performed using the homography data structure and/or the first coordinate to determine the second coordinate. Alternatively and/or additionally, one or more operations (e.g., mathematical operations) may be performed using the homography data structure, a horizontal axis coordinate of the first coordinate and/or a vertical axis coordinate of the first coordinate to determine the second coordinate (e.g., a horizontal axis coordinate of the second coordinate and/or a vertical axis coordinate of the second coordinate may be determined). Alternatively and/or additionally, each coordinate of the second set of coordinates may be determined by combining the homography data structure with a corresponding coordinate of the first set of coordinates.

At 418, the first graphical object may be projected onto the second video frame based upon the second set of coordinates. In some examples, the first graphical object may be projected onto the first surface (based upon the second set of coordinates). In some examples, the second set of coordinates may correspond to a set of corners of the first graphical object, with respect to the second video frame. For example, the first graphical object may be projected onto the second video frame such that the first graphical object is within the second set of coordinates and/or (overlaid) on the second set of coordinates. In some examples, a second augmented video frame comprising a representation (e.g., a projection) of the first graphical object may be generated.

Alternatively and/or additionally, a second representation of the first graphical object may be generated based upon the second set of coordinates. In some examples, a second size of the second representation of the first graphical object, a second shape of the second representation of the first graphical object and/or a second angle of the second representation of the first graphical object with respect to the second video frame may be determined based upon the second set of coordinates. For example, the second representation of the first graphical object may be generated based upon the second size, the second shape and/or the second angle. Alternatively and/or additionally, the second representation of the first graphical object may be projected onto the second video frame based upon the second set of coordinates.

It may be appreciated that using one or more of the techniques presented herein for automatically determining the second set of coordinates and/or for projecting the first graphical object onto the second video frame based upon the second set of coordinates may increase a stability of the first graphical object on the first surface from frame to frame and/or may increase a quality of the first graphical object and/or the first augmented video (e.g., the first graphical object may appear more realistic and/or may seem to be "stuck" to the first surface at an initial position corresponding to the first set of coordinates). For example, by determining the first set of objects within the first video frame and/or the second set of objects within the second video frame and/or by determining the first relationship (and/or the homography data structure) based upon keypoints that do not correspond to the first set of objects and/or the second set of objects, a probability that keypoints of the first set of keypoints and/or the second set of keypoints correspond to moving objects decreases (and/or becomes zero). Determining the first relationship based upon keypoints that do not correspond to moving objects may reduce noise associated with determining the first relationship and/or determining the second set of coordinates. Thus, the first relationship and/or the homography data structure may be more accurately determined and/or may more accurately reflect a transformation between the first video frame and the second video frame, such as one or more of the shift of the camera during filming of the first video (and/or during filming of the first video frame and/or the second video frame), the rotation of the camera around the center of the camera during filming of the first video (and/or during filming of the first video frame and/or the second video frame), the zooming of the camera during filming of the first video (and/or during filming of the first video frame and/or the second video frame), the panning associated with the first video frame and the second video frame, etc. Accordingly, the second set of coordinates may be more accurately determined based upon the first relationship and/or the homography data structure. Thus, the first graphical object may be projected onto the second video frame, based upon the second set of coordinates, in a more accurate, a more realistic and/or a more visually appealing way.

In some examples, the first graphical object may be projected onto the second video frame based upon the second set of objects. For example, the second video frame may be analyzed based upon the second set of objects to determine a first set of regions (e.g., a set of one or more regions) of the second video frame associated with a positional overlap of the second set of objects (and/or one or more second moving objects of the second set of objects) and the first graphical object (e.g., the second representation of the first graphical object). For example, the first set of regions may correspond to a first set of pixels of the second video frame. In some examples, one or more first portions of the first graphical object that correspond to the first set of regions and/or the first set of pixels may not be projected onto the second video frame. For example, the one or more first portions of the first graphical object may not be projected onto the second video frame such that the first graphical object (and/or the one or more portions of the first graphical object) is not overlaid onto the first set of regions corresponding to the second set of objects. It may be appreciated that by determining the first set of regions (and/or the first set of pixels) and/or by projecting the first graphical object onto the second video frame based upon the first set of regions (and/or the first set of pixels) may increase a quality of the first augmented video (e.g., the first graphical object may appear more realistically projected onto the first surface because the first graphical object may not be overlaid onto one or more objects of the second video frame that may be on top of the first surface and/or may be moving).

In some examples, a second object mask may be generated based upon the second set of objects and/or the one or more second moving objects of the second set of objects. The second object mask may be representative of third regions and/or third pixels of the second video frame that are occupied by the second set of objects and/or the one or more second moving objects. Alternatively and/or additionally, the second object mask may be representative of boundaries associated with the third regions and/or the third pixels of the second video frame that are occupied by the second set of objects and/or the one or more second moving objects.

Alternatively and/or additionally, the second object mask may be representative of regions and/or pixels of the second video frame that are not occupied by the second set of objects and/or the one or more second moving objects. In some examples, the first set of regions and/or the first set of pixels of the second video frame may be determined based upon the second object mask and/or the first graphical object. Alternatively and/or additionally, regions (e.g., pixels) associated with projection of the first graphical object onto the second video frame may be compared with the second object mask to determine the first set of regions and/or the first set of pixels that are associated with the second set of objects and/or the one or more second moving objects.

In some examples, the first graphical object may be projected onto the second video frame based upon the second object mask and/or the first set of pixels. For example, a first region (e.g., a first pixel) of the second video frame associated with projection of the first graphical object onto the second video frame may be compared with the second object mask to determine whether the first region is included in the third regions and/or the third pixels of the second video frame and/or whether the first region is associated with the second set of objects and/or the one or more second moving objects. Responsive to a determination that the first region is not included in the third regions and/or the third pixels of the second video frame, a first portion of the first graphical object corresponding to the first region may be projected onto the second video frame, such that the first region may be changed to include the first portion of the first graphical object in the second augmented video frame.

Alternatively and/or additionally, a second region (e.g., a second pixel) of the second video frame associated with projection of the second graphical object onto the second video frame may be compared with the second object mask to determine whether the second region is included in the third regions and/or the third pixels of the second video frame and/or whether the second region is associated with the second set of objects and/or the one or more second moving objects. Responsive to a determination that the second region is included in the third regions and/or the third pixels of the second video frame, a second portion of the first graphical object corresponding to the second region may not be projected onto the second video frame, such that the second region may not be changed to include the second portion of the first graphical object in the second augmented video frame.

Figure 5I:
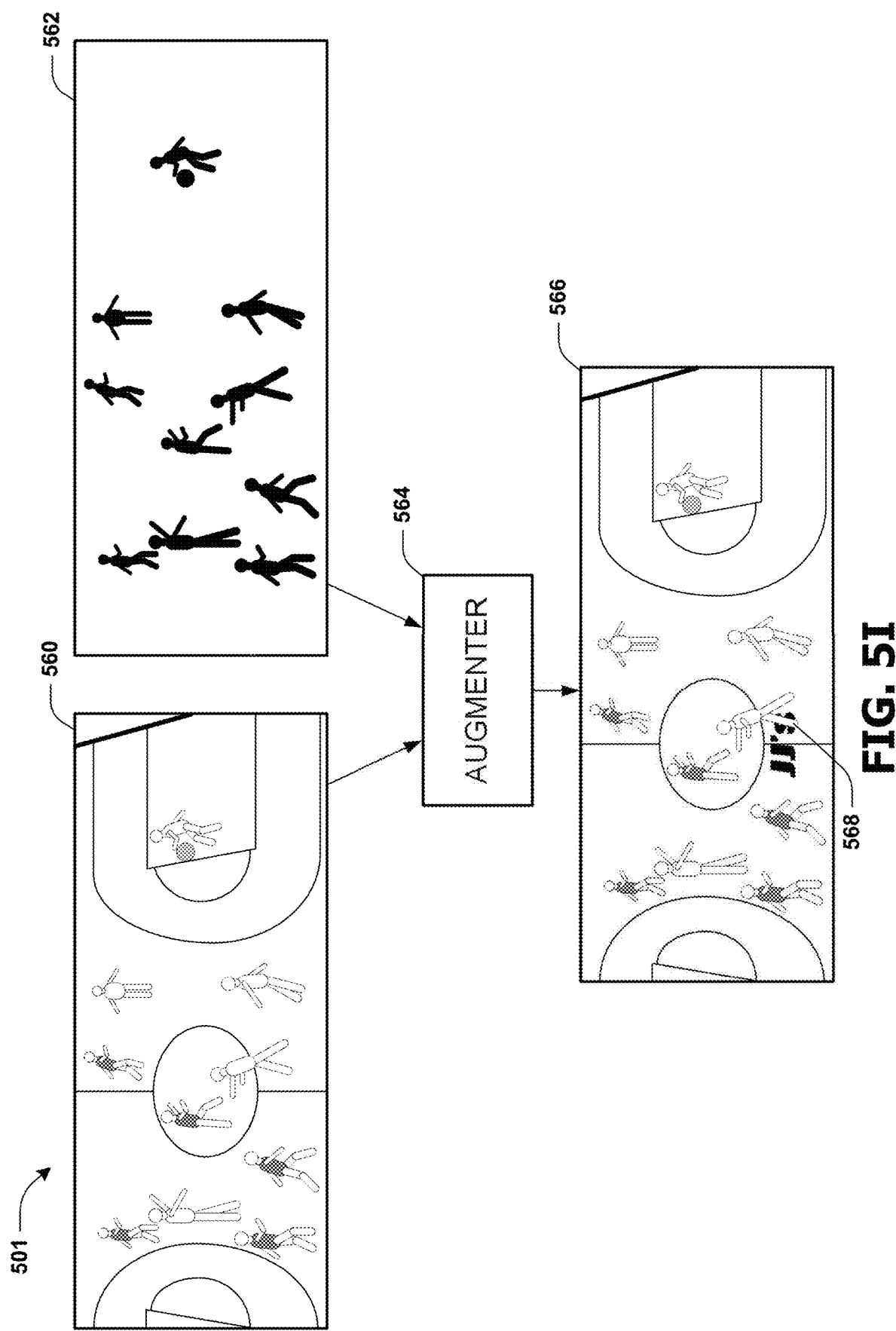
FIG. 5I is a component block diagram illustrating an example system for generating augmented videos, where a first graphical object is projected onto a second video frame.

FIG. 5I illustrates an example scenario in which the first graphical object is projected onto the second video frame. A representation 560 of FIG. 5I is an example of the second video frame. A representation 562 of FIG. 5I is an example of the second object mask generated based upon the second set of objects and/or the one or more second moving objects. For example, the second object mask may be representative of third regions and/or third pixels of the second video frame that are occupied by the second set of objects and/or the one or more second moving objects. Alternatively and/or additionally, the second object mask may be representative of boundaries associated with the third regions and/or the third pixels of the second video frame that are occupied by the second set of objects and/or the one or more second moving objects.

The first graphical object may be projected onto the second video frame based upon the second object mask and/or the second video frame using an augmenter 564. For example, regions (e.g., pixels) associated with projection of the first graphical object onto the second video frame may be compared with the second object mask to determine the first set of regions and/or the first set of pixels that are associated with a positional overlap of a portion of the first graphical object and the second set of objects and/or the one or more second moving objects. For example, the portion of the first graphical object associated with the first set of regions and/or the first set of pixels may not be projected onto the second video frame such that the first graphical object (and/or the portion of the first graphical object) is not overlaid onto the first set of regions corresponding to the second set of objects. A representation 564 of FIG. 5I is an example of the second augmented video frame comprising a representation of the first graphical object. For example, the first graphical object may not be overlaid onto a first object 568 (e.g., a basketball player) of the second set of objects due to not projecting the portion of the first graphical object associated with the positional overlap with the second set of objects and/or the one or more second moving objects.

At 420, the first graphical object may be projected onto a second plurality of video frames of the first plurality of video frames to generate the first augmented video. For example, the first graphical object may be projected onto the second plurality of video frames by performing a propagation process to propagate the first graphical object to the second plurality of video frames. In some examples, the second plurality of video frames may comprise a first set of video frames of the first video and/or a second set of video frames of the first video.

In some examples, with respect to the order of video frames of the first plurality of video frames and/or the first video, the first set of video frames may precede the first video frame. In an example where the second video frame precedes the first video frame with respect to the order of video frames of the first plurality of video frames and/or the first video frame corresponds to frame number n, the second video frame may correspond to frame number n−1 and/or the first set of video frames may correspond to frame numbers n−2, n−3, n−4, n−5, etc. Alternatively and/or additionally, in an example where the second video frame follows the first video frame with respect to the order of video frames of the first plurality of video frames and/or the first video corresponds to frame number n, the first set of video frames may correspond to frame numbers n−1, n−2, n−3, n−4, etc.

Alternatively and/or additionally, with respect to the order of the video frames of the first plurality of video frames and/or the first video, the second set of video frames may follow the first video frame. In an example where the second video frame follows the first video frame with respect to the order of video frames of the first plurality of video frames and/or the first video frame corresponds to frame number n, the second video frame may correspond to frame number n+1 and/or the first set of video frames may correspond to frame numbers n+2, n+3, n+4, n+5, etc. Alternatively and/or additionally, in an example where the second video frame precedes the first video frame with respect to the order of video frames of the first plurality of video frames and/or the first video corresponds to frame number n, the first set of video frames may correspond to frame numbers n+1, n+2, n+3, n+4, etc.

In some examples, the first graphical object may be projected onto the first set of video frames (preceding the first video frame) by determining a relationship (and/or homography) between a first exemplary video frame of the first set of video frames and a second exemplary video frame following the first exemplary video frame and/or by determining a set of coordinates for projection of the first graphical object based upon the relationship (and/or the homography). For example, a fourth plurality of keypoints associated with a third video frame of the first set of video frames may be determined. The fourth plurality of keypoints may be determined based upon a third set of objects and/or one or more third moving objects associated with the third video frame. Alternatively and/or additionally, an exemplary relationship between the third video frame and a succeeding video frame may be determined based upon the fourth plurality of keypoints and/or an exemplary plurality of keypoints associated with the succeeding video frame. For example, a second homography data structure may be generated based upon the fourth plurality of keypoints and/or the exemplary plurality of keypoints. The second homography data structure may relate points of the succeeding video frame to points of the third video frame. The succeeding video frame may correspond to a video frame that follows (e.g., succeeds) the third video frame with respect to the order of video frames of the first plurality of video frames (e.g., the succeeding video frame may correspond to the first video frame, the second video frame and/or a different video frame that follows the third video frame). Alternatively and/or additionally, the succeeding video frame may be contiguous to the third video frame. In some examples, a third set of coordinates of the third video frame may be determined for projection of the first graphical object based upon the exemplary relationship between the third video frame and the succeeding video frame and/or based upon the second homography data structure. Alternatively and/or additionally, the third set of coordinates of the third video frame may be determined based upon a succeeding set of coordinates associated with projection of the first graphical object onto the succeeding video frame. The first graphical object may be projected onto the third video frame based upon the third set of coordinates (e.g., a third augmented video frame associated with the third video frame may be generated comprising a representation of the first graphical object). Alternatively and/or additionally, using one or more of the techniques presented herein, the first graphical object may be projected onto the third video frame based upon the third set of objects and/or the one or more third moving objects such that the first graphical object is not overlaid onto the third set of objects and/or the one or more third moving objects.

Alternatively and/or additionally, the first graphical object may be projected onto the second set of video frames (following the first video frame) by determining a relationship (and/or homography) between a third exemplary video frame of the second set of video frames and a fourth exemplary video frame preceding the third exemplary video frame and/or by determining a set of coordinates for projection of the first graphical object based upon the relationship (and/or the homography). For example, a fifth plurality of keypoints associated with a fourth video frame of the second set of video frames may be determined. The fifth plurality of keypoints may be determined based upon a fourth set of objects and/or one or more fourth moving objects associated with the fourth video frame. Alternatively and/or additionally, a second exemplary relationship between the fourth video frame and a preceding video frame may be determined based upon the fifth plurality of keypoints and/or a second exemplary plurality of keypoints associated with the preceding video frame. For example, a third homography data structure may be generated based upon the fifth plurality of keypoints and/or the second exemplary plurality of keypoints. The third homography data structure may relate points of the preceding video frame to points of the fourth video frame. The preceding video frame may correspond to a video frame that precedes the fourth video frame with respect to the order of video frames of the first plurality of video frames (e.g., the preceding video frame may correspond to the first video frame, the second video frame and/or a different video frame that precedes the fourth video frame). Alternatively and/or additionally, the preceding video frame may be contiguous to the fourth video frame. In some examples, a fourth set of coordinates of the fourth video frame may be determined for projection of the first graphical object based upon the second exemplary relationship between the fourth video frame and the preceding video frame and/or based upon the third homography data structure. Alternatively and/or additionally, the fourth set of coordinates of the fourth video frame may be determined based upon a preceding set of coordinates associated with projection of the first graphical object onto the preceding video frame. The first graphical object may be projected onto the fourth video frame based upon the fourth set of coordinates (e.g., a fourth augmented video frame associated with the fourth video frame may be generated comprising a representation of the first graphical object). Alternatively and/or additionally, using one or more of the techniques presented herein, the first graphical object may be projected onto the fourth video frame based upon the fourth set of objects and/or the one or more fourth moving objects such that the first graphical object is not overlaid onto the fourth set of objects and/or the one or more fourth moving objects.

In some examples, the first graphical object may be projected onto the first set of video frames sequentially (and/or non-sequentially). For example, the first graphical object may be propagated and/or projected onto the first set of video frames frame-by-frame in a backward direction with respect to the order of video frames of the first plurality of video frames. For example, using one or more of the techniques presented herein, the first graphical object may be projected onto a fifth exemplary video frame corresponding to frame number n−1 (and/or frame number n−2 if the second video frame precedes the first video frame) based upon a relationship (e.g., a homography) between the fifth exemplary video frame and the first video frame corresponding to frame number n (and/or the second video frame corresponding to frame number n−1), the first graphical object may be projected onto a sixth exemplary video frame corresponding to frame number n−2 (and/or frame number n−3) based upon a relationship (e.g., a homography) between the sixth exemplary video frame and the fifth exemplary video frame corresponding to frame number n−1 (and/or frame number n−2), the first graphical object may be projected onto a seventh exemplary video frame corresponding to frame number n−3 (and/or frame number n−4) based upon a relationship (e.g., a homography) between the seventh exemplary video frame and the sixth exemplary video frame corresponding to frame number n−2 (and/or frame number n−3), etc.

Alternatively and/or additionally, the first graphical object may be projected onto the second set of video frames sequentially (and/or non-sequentially). For example, the first graphical object may be projected onto the second set of video frames frame-by-frame in a forward direction with respect to the order of video frames of the first plurality of video frames. For example, using one or more of the techniques presented herein, the first graphical object may be projected onto an eighth exemplary video frame corresponding to frame number n+1 (and/or frame number n+2 if the second video frame follows the first video frame) based upon a relationship (e.g., a homography) between the eighth exemplary video frame and the first video frame corresponding to frame number n (and/or the second video frame corresponding to frame number n+1), the first graphical object may be projected onto a ninth exemplary video frame corresponding to frame number n+2 (and/or frame number n+3) based upon a relationship (e.g., a homography) between the ninth exemplary video frame and the eighth exemplary video frame corresponding to frame number n+1 (and/or frame number n+2), the first graphical object may be projected onto a tenth exemplary video frame corresponding to frame number n+3 (and/or frame number n+4) based upon a relationship (e.g., a homography) between the tenth exemplary video frame and the ninth exemplary video frame corresponding to frame number n+2 (and/or frame number n+3), etc.

In some examples, one or more video frames of the first plurality of video frames may comprise merely a portion of the first section of the first surface (upon which the first graphical object is projected). For example, a tenth exemplary video frame of the one or more video frames may have a partial view of the first section of the first surface as a result of rotation of the camera filming the first video. For example, the tenth exemplary video frame may comprise a first portion of the first section of the first surface (e.g., the tenth exemplary video frame may have a view of the first portion of the first section of the first surface). A portion of the first graphical object, corresponding to the first portion of the first section of the first surface, may be projected onto the tenth exemplary video frame. For example, a third representation of the first graphical object may be generated based upon the first portion of the first section of the first surface. The third representation of the first graphical object may be projected onto the tenth exemplary video frame.

In some examples, responsive to determining that a fifth video frame of the first plurality of video frames does not comprise the first section of the first surface (upon which the first graphical object is projected), a set of coordinates may not be determined for projection of the first graphical object onto the fifth video frame and/or the first graphical object may not be projected onto the fifth video frame. For example, the fifth video frame may not have a view of the first section of the first surface as a result of rotation of the camera filming the first video. In some examples, it may be determined that video frames of a third set of video frames (e.g., a set of one or more video frames), comprising the fifth video frame, do not comprise the first section of the first surface (and/or do not have a view of the first section of the first surface). The first graphical object may not be projected onto video frames of the third set of video frames.

In some examples, it may be determined that the fifth video frame of the first plurality of video frames does not comprise the first section of the first surface (and/or does not have a view of the first section of the first surface) based upon a fourth relationship between the fifth video frame and a sixth video frame and/or a fourth homography data structure associated with the fourth relationship. For example, the fourth homography data structure having one or more values that meet a first threshold may be indicative of the fifth video frame of the first plurality of video frames not comprising the first section of the first surface.

Alternatively and/or additionally, it may be determined that the fifth video frame of the first plurality of video frames does not comprise the first section of the first surface (and/or does not have a view of the first section of the first surface) based upon a fifth relationship between the sixth video frame and a seventh video frame and/or a fifth homography data structure associated with the fifth relationship. The fifth video frame may be contiguous to the sixth video frame and/or the sixth video frame may be contiguous to the seventh video frame. In some examples, the fifth video frame may precede the first set of video frames and/or the sixth video frame may be an initial video frame of the first set of video frames with respect to the order of the first plurality of video frames. Alternatively and/or additionally, the seventh video frame may follow the sixth video frame. For example, if the fifth video frame corresponds to frame number m of the first plurality of frame numbers, the sixth video frame may correspond to frame number m+1 of the first plurality of frame numbers and/or the seventh video frame may correspond to frame number m+2 of the first plurality of frame numbers. It may be determined that the fifth video frame of the first plurality of video frames does not comprise the first section of the first surface (and/or does not have a view of the first section of the first surface) responsive to a determination that a Euclidean distance between the fourth homography data structure and the fifth homography data structure meets a second threshold.

Alternatively and/or additionally, a set of coordinates may not be determined for projection of the first graphical object onto the fifth video frame and/or the first graphical object may not be projected onto the fifth video frame responsive to a determination that the fifth video frame meets one or more conditions associated with not projecting the first graphical object onto the fifth video frame. For example, the one or more conditions may be met if the fifth video frame not comprise the first section of the first surface. Alternatively and/or additionally, the one or more conditions may be met if the fifth video frame does not comprise a portion of the first section of the first surface. Alternatively and/or additionally, the one or more conditions may be met if the fifth video frame has more than a threshold level of distortion. In some examples, the one or more conditions may correspond to user-inputted conditions (e.g., the one or more conditions may be determined based upon one or more user-inputted settings received via the video interface).

In an example where the fifth video frame precedes the first set of video frames, the first graphical object may be propagated and/or projected frame-by-frame onto video frames preceding the first video frame in the backward direction with respect to the order of video frames until the fifth video frame is reached and/or it is determined that the fifth video frame of the first plurality of video frames does not comprise the first section of the first surface (and/or does not have a view of the first section of the first surface) and/or it is determined that the fifth video frame meets the one or more conditions.

In an example where the fifth video frame follows the second set of video frames, the first graphical object may be propagated and/or projected frame-by-frame onto video frames following the first video frame in the forward direction with respect to the order of video frames until the fifth video frame is reached and/or it is determined that the fifth video frame of the first plurality of video frames does not comprise the first section of the first surface (and/or does not have a view of the first section of the first surface) and/or it is determined that the fifth video frame meets the one or more conditions.

In an example where the fifth video frame precedes the first set of video frames, responsive to determining that the fifth video frame of the first plurality of video frames does not comprise the first section of the first surface (and/or does not have a view of the first section of the first surface) and/or that the fifth video frame meets the one or more conditions, first video frames of the first plurality of video frames, preceding the first set of video frames of the first plurality of video frames, may be analyzed to automatically detect and/or identify the first section of the first surface within the first video frames. For example, the first video frames may be analyzed based upon one or more characteristics associated with the first surface and/or the first section of the first surface. For example, responsive to detecting the first surface and/or the first section of the first surface within an eighth video frame of the first video frames, a fifth set of coordinates may automatically be determined for projection of the first graphical object onto the eighth video frame. The first graphical object may be projected onto the eighth video frame (to generate an augmented video frame corresponding to the eighth video frame) based upon the fifth set of coordinates. Alternatively and/or additionally, the first graphical object may be projected onto a fourth set of video frames preceding (and/or following) the eighth video frame using one or more of the techniques presented herein.

In an example where the fifth video frame follows the second set of video frames, responsive to determining that the fifth video frame of the first plurality of video frames does not comprise the first section of the first surface (and/or does not have a view of the first section of the first surface) and/or that the fifth video frame meets the one or more conditions, second video frames of the first plurality of video frames, following the second set of video frames of the first plurality of video frames, may be analyzed to automatically detect and/or identify the first section of the first surface within the second video frames. For example, the second video frames may be analyzed based upon one or more characteristics associated with the first surface and/or the first section of the first surface. For example, responsive to detecting the first surface and/or the first section of the first surface within a ninth video frame of the second video frames, a sixth set of coordinates may automatically be determined for projection of the first graphical object onto the ninth video frame. The first graphical object may be projected onto the ninth video frame (to generate an augmented video frame corresponding to the ninth video frame) based upon the sixth set of coordinates. Alternatively and/or additionally, the first graphical object may be projected onto a fifth set of video frames following (and/or preceding) the ninth video frame using one or more of the techniques presented herein.

In some examples, a plurality of augmented video frames may be generated (e.g., the plurality of augmented video frames may comprise representations of the first graphical object projected onto the first section of the first surface). For example, the plurality of augmented video frames may comprise the first augmented video frame, the second augmented video frame, augmented video frames generated based upon the first set of video frames and/or augmented video frames generated based upon the second set of video frames. In some examples, the first augmented video may be generated using the plurality of augmented video frames. For example, the plurality of augmented video frames may be compiled to generate the first augmented video.

Alternatively and/or additionally, the first augmented video may comprise the plurality of augmented video frames and/or a third plurality of video frames of the first plurality of video frames. For example, video frames of the third plurality of video frames may not comprise the first section of the first surface and/or may not have a view of the first section of the first surface. In some examples, the first augmented video may be generated using the plurality of augmented video frames and/or the third plurality of video frames. For example, the plurality of augmented video frames and/or the third plurality of video frames may be compiled to generate the first augmented video in accordance with the order of video frames of the first plurality of video frames and/or the first video.

In some examples, rather than projecting merely a single graphical object (e.g., the first graphical object) onto video frames of the first plurality of video frames to generate the plurality of augmented video frames, multiple graphical objects may be projected onto video frames of the first plurality of video frames to generate the plurality of augmented video frames. For example, the first request to generate the first augmented video may comprise a plurality of graphical objects, comprising the first graphical object.

The first request may be indicative of projecting the plurality of graphical objects onto the video frames of the first plurality of video frames. For example, the first graphical object and/or a second graphical object may be projected onto the first video frame to generate the first augmented video frame. For example, using one or more of the techniques presented herein, the second graphical object may be projected onto a second section of a second surface within the first video frame, separate from the first section of the first surface. For example, the second surface may be the same as the first surface. Alternatively and/or additionally, the second surface may be different than the first surface.

Alternatively and/or additionally, using one or more of the techniques presented herein, the first graphical object may be projected onto a fourth plurality of video frames of the first plurality of video frames of the first video frame and/or the second graphical object may be projected onto a fifth plurality of video frames of the first plurality of video frames. For example, the fourth plurality of video frames may be selected for projection of the first graphical object based upon a first proportion of video frames of the first plurality of video frames and/or the plurality of augmented video frames. For example, the first proportion of video frames of the first plurality of video frames and/or the plurality of augmented video frames may be one or more of a percentage, a proportion, etc. of the first plurality of video frames and/or the plurality of augmented video frames for projection of the first graphical object. Alternatively and/or additionally, the fifth plurality of video frames may be selected for projection of the second graphical object based upon a second proportion of video frames of the first plurality of video frames and/or the plurality of augmented video frames. For example, the second proportion of video frames of the first plurality of video frames and/or the plurality of augmented video frames may be one or more of a percentage, a proportion, etc. of the first plurality of video frames and/or the plurality of augmented video frames for projection of the second graphical object. In some examples, the first request to generate the first augmented video may be indicative of the first proportion of video frames and/or the second proportion of video frames.

In an example, the first proportion of video frames may be indicative of 50% of the plurality of augmented video frames. Alternatively and/or additionally, the second proportion of video frames may be indicative of 50% of the plurality of augmented video frames. Accordingly, a first set of augmented video frames, comprising about 50% of the plurality of augmented video frames, may comprise representations of the first graphical object. Alternatively and/or additionally, a second set of augmented video frames, comprising about 50% of the plurality of augmented video frames, may comprise representations of the second graphical object. The second set of augmented video frames may be different than the first set of augmented video frames.

In some examples, the first augmented video may be uploaded provided to a content server associated with a content platform for viewing and/or downloading content (e.g., videos, music, articles, etc.) associated with a content system. The content platform may be accessed via an application, a content interface, a browser, etc. of a client device.

In some examples, a second client device may access the content platform via a content interface (e.g., a browser, an application, etc.) associated with the content platform. For example, a request to access the first augmented video may be received from the second client device and/or a server associated with the second client device. Responsive to receiving the request to access the first augmented video, the first augmented video may be transmitted to the second client device and/or displayed via the second client device.

Alternatively and/or additionally, the content interface may display a third selectable input (e.g., a button) associated with the first augmented video and/or a fourth selectable input associated with the first video. In some examples, the fourth selectable input may be associated with presenting the first video and/or content different than the first video. For example, the content may be associated with the entity (associated with the first graphical object) and/or a different entity. Alternatively and/or additionally, the content may correspond to promotional content (e.g., an advertisement). Responsive to a selection of the fourth selectable input, the content may be overlaid onto the first video for a period of time. Alternatively and/or additionally, responsive to the selection of the fourth selectable input, the content may be displayed adjacent to the video. Alternatively and/or additionally, responsive to the selection of the fourth selectable input, the content may be displayed for a period of time and/or access to the first video may be prevented until the content (e.g., a video clip) has been (fully and/or partially) presented and/or a selection of the content has occurred. Alternatively and/or additionally, responsive to a selection of the third selectable input, the first augmented video may be displayed and/or the content may not be displayed (and/or the content may be displayed).

Alternatively and/or additionally, a plurality of augmented videos associated with the first video may be generated based upon the first video and/or a second plurality of graphical objects. For example, a second augmented video of the plurality of augmented videos may comprise representations of one or more first graphical objects (of the second plurality of graphical objects) projected onto video frames of the second augmented video. The one or more first graphical objects may be associated with one or more first entities and/or one or more first topics. Alternatively and/or additionally, a third augmented video of the plurality of augmented videos may comprise representations of one or more second graphical objects (of the second plurality of graphical objects) projected onto video frames of the second augmented video. The one or more second graphical objects may be associated with one or more second entities and/or one or more second topics.

In some examples, a request to access an augmented video of the plurality of augmented videos may be received from the second client device and/or a server associated with the second client device. For example, responsive to receiving the request to access an augmented video of the plurality of augmented videos, a user profile database comprising a plurality of user profiles may be analyzed to identify a first user profile associated with the second client device and/or associated with a user account (associated with the second client device). For example, the first user profile may comprise search history information, website browsing history, email information, user demographic information, location information, etc. associated with the second client device and/or the user account.

In some examples, one or more interests of a user associated with the second client device and/or the user account may be determined based upon the first user profile. Alternatively and/or additionally, a fourth augmented video may be selected from the plurality of augmented videos for transmission to the second client device based upon the first user profile and/or the one or more interests of the user. For example, the fourth augmented video may comprise representations of one or more third graphical objects (of the second plurality of graphical objects) projected onto video frames of the fourth augmented video. The one or more third graphical objects may be associated with one or more third entities and/or one or more third topics. For example, the fourth augmented video may be selected for transmission to the second client device based upon the one or more third entities and/or one or more third topics. For example, it may be determined that the first user profile and/or the one or more third interests of the user are associated with (and/or match) the one or more third entities and/or the one or more third topics associated with the one or more third graphical objects. The fourth augmented video may be transmitted to the second client device and/or displayed via the second client device.

It may be appreciated that the disclosed subject matter may assist a user (e.g., and/or a client device associated with the user) in generating augmented videos based upon videos and/or graphical objects. Alternatively and/or additionally, the disclosed subject matter may assist a user in consuming and/or viewing an augmented video having a representation of a graphical object projected onto a surface of the augmented video in a realistic and/or visually appealing way.

Implementation of at least some of the disclosed subject matter may lead to benefits including, but not limited to, a reduction in screen space and/or an improved usability of a display (e.g., of the client device) (e.g., as a result of enabling the user and/or the client device to generate augmented videos based upon videos and/or graphical objects automatically, wherein the user may not need to open a separate application and/or use a separate operating system in order to generate the augmented videos, etc.).

Alternatively and/or additionally, implementation of at least some of the disclosed subject matter may lead to benefits including a reduction in screen space and/or an improved usability of the display (e.g., as a result of enabling the user and/or the client device to generate augmented videos based upon videos and/or graphical objects automatically, wherein the user may not need to open separate application and/or use a separate operating system in order to generate the augmented videos, etc.).

Alternatively and/or additionally, implementation of at least some of the disclosed subject matter may lead to benefits including a reduction in screen space and/or an improved usability of the display (e.g., as a result of enabling the user and/or the client device to view and/or display the first augmented video (comprising the first graphical object associated with the entity) rather than viewing and/or displaying (both) the first video and content associated with the entity, separately, etc.).

Alternatively and/or additionally, implementation of at least some of the disclosed subject matter may lead to benefits including a reduction in bandwidth (e.g., as a result of merely transmitting the first augmented video rather than transmitting (both) the first video and the content associated with the entity to the client device).

Alternatively and/or additionally, implementation of at least some of the disclosed subject matter may lead to benefits including an increase in quality of the first augmented video (e.g., as a result of determining the first set of objects within the first video frame and/or the second set of objects within the second video frame, as a result of determining the first relationship and/or the homography data structure based upon keypoints that do not correspond to the first set of objects and/or the second set of objects, such that the first relationship and/or the homography data structure may be more accurately determined and/or may more accurately reflect a transformation between the first video frame and the second video frame, such as one or more of the shift of the camera during filming of the first video (and/or during filming of the first video frame and/or the second video frame), the rotation of the camera around the center of the camera during filming of the first video (and/or during filming of the first video frame and/or the second video frame), the zooming of the camera during filming of the first video (and/or during filming of the first video frame and/or the second video frame), the panning associated with the first video frame and the second video frame, etc., as a result of determining the second set of coordinates more accurately based upon the first relationship and/or the homography data structure, as a result of the first graphical object being projected onto the second video frame, based upon the second set of coordinates, in a more accurate, a more realistic and/or a more visually appealing way, etc.).

Alternatively and/or additionally, implementation of at least some of the disclosed subject matter may lead to benefits including an increase in quality of the first augmented video (e.g., as a result of determining the second set of objects associated with the second video frame, as a result of determining the first set of regions (and/or the first set of pixels) of the second video frame associated with the positional overlap of the second set of objects and the first graphical object, as a result of projecting the first graphical object onto the second video frame based upon the first set of regions (and/or the first set of pixels) such that the first graphical object may not be overlaid onto one or more objects of the second video frame that may be on top of the first surface and/or may be moving, etc.).

Alternatively and/or additionally, implementation of at least some of the disclosed subject matter may lead to benefits including a reduction in manual effort required to generate the first augmented video (e.g., as a result of merely requiring the first set of coordinates for projection of the first graphical object onto the first video frame, as a result of automatically projecting the first graphical object onto the first set of video frames preceding the first video frame by propagating the first graphical object onto the first set of video frames in a backward direction, as a result of automatically projecting the first graphical object onto the second set of video frames following the first video frame by propagating the first graphical object onto the second set of video frames in a forward direction, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 6:
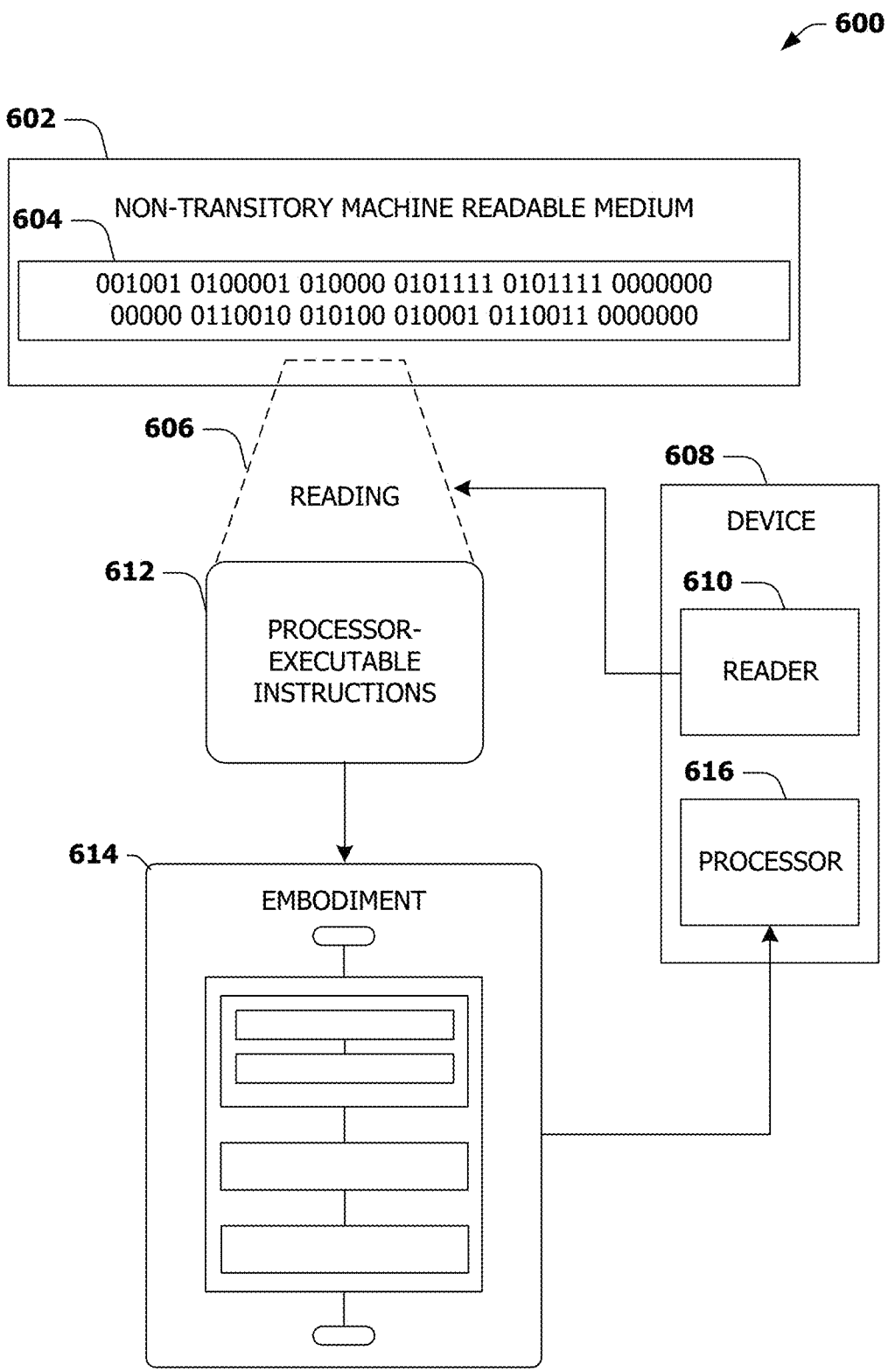
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the example system 501 of FIGS. 5A-5I, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
receiving a request to generate an augmented video based upon a graphical object and a video;
determining, for projection of the graphical object, a first set of coordinates of a first video frame of a plurality of video frames of the video;
projecting the graphical object onto the first video frame based upon the first set of coordinates;
determining a context of the video;
analyzing the first video frame, based upon the context of the video, to detect a set of objects within the first video frame;
determining a first plurality of keypoints on the first video frame based upon the set of objects;
determining a second plurality of keypoints, associated with the first plurality of keypoints, on a second video frame of the plurality of video frames, wherein a keypoint of the second plurality of keypoints corresponds to a keypoint of the first plurality of keypoints;
determining, based upon the first plurality of keypoints and the second plurality of keypoints, a relationship between the first video frame and the second video frame;
determining, for projection of the graphical object, a second set of coordinates of the second video frame based upon the first set of coordinates and the relationship between the first video frame and the second video frame; and generating the augmented video comprising:
projecting the graphical object onto the second video frame based upon the second set of coordinates; and
projecting the graphical object onto a second plurality of video frames of the plurality of video frames without projecting the graphical object onto a third video frame of the plurality of video frames responsive to determining that the third video frame has a level of distortion exceeding a threshold level of distortion.

2. The method of claim 1, wherein the threshold level of distortion is determined based upon one or more user-inputted settings received via a video interface associated with augmenting videos.

3. The method of claim 1, wherein:
the first set of coordinates is associated with a surface within the first video frame; and
the projecting the graphical object onto the first video frame comprises projecting the graphical object onto the surface.

4. The method of claim 1, wherein:
the request to generate the augmented video comprises one or more graphical object positioning characteristics; and
the first set of coordinates of the first video frame is determined based upon the one or more graphical object positioning characteristics in the request to generate the augmented video.

5. The method of claim 4, wherein the one or more graphical object positioning characteristics comprise (i) a size of the graphical object with respect to at least one of the first video frame or one or more other video frames of the plurality of video frames and (ii) a positioning of the graphical object with respect to a surface within the first video frame.

6. The method of claim 4, wherein the one or more graphical object positioning characteristics comprise at least one of (i) a size of the graphical object with respect to at least one of the first video frame or one or more other video frames of the plurality of video frames or (ii) a positioning of the graphical object with respect to a surface within the first video frame.

7. The method of claim 1, wherein the determining the first plurality of keypoints on the first video frame comprises:
determining a third plurality of keypoints on the first video frame;
determining, based upon a comparison of the third plurality of keypoints with the set of objects, one or more keypoints of the third plurality of keypoints intersecting with the set of objects; and
removing the one or more keypoints from the third plurality of keypoints.

8. The method of claim 1, wherein keypoints of the first plurality of keypoints do not intersect with the set of objects.

9. The method of claim 8, wherein the set of objects comprises at least one of:
one or more moving objects; or
one or more unstable objects.

10. The method of claim 1, wherein the graphical object comprises at least one of:
a two-dimensional image;
a three-dimensional object; or
a second video.

11. The method of claim 1, comprising determining a first type of object and a second type of object based upon the context, wherein the analyzing the first video frame, based upon the context of the video, to detect the set of objects comprises:
analyzing the first video frame, based upon the first type of object, to detect a first object; and
analyzing the first video frame, based upon the second type of object, to detect a second object.

12. The method of claim 1, wherein:
the second plurality of video frames comprises a first set of video frames preceding the first video frame and the second video frame with respect to an order of video frames of the plurality of video frames of the video;
the second plurality of video frames comprises a second set of video frames following the first video frame and the second video frame with respect to the order of video frames of the plurality of video frames of the video; and
the projecting the graphical object onto the second plurality of video frames of the plurality of video frames comprises:
projecting the graphical object onto the first set of video frames preceding the first video frame and the second video frame frame-by-frame in a backward direction with respect to the order of video frames of the plurality of video frames of the video until a fourth video frame preceding the first set of video frames is reached, wherein the graphical object is not projected onto the fourth video frame based upon the fourth video frame meeting one or more conditions; and
projecting the graphical object onto the second set of video frames following the first video frame and the second video frame frame-by-frame in a forward direction with respect to the order of video frames of the plurality of video frames of the video until a fifth video frame is reached, wherein the graphical object is not projected onto the fifth video frame based upon the fifth video frame meeting the one or more conditions.

13. A computing device comprising:
a processor; and
memory comprising processor-executable instructions that when executed by the processor cause performance of operations, the operations comprising:
receiving a request to generate an augmented video based upon a graphical object and a video;
determining, for projection of the graphical object, a first set of coordinates of a first video frame of a plurality of video frames of the video;
projecting the graphical object onto the first video frame based upon the first set of coordinates;
analyzing the first video frame, based upon a context of the video, to detect a set of objects within the first video frame;
determining a first plurality of keypoints on the first video frame based upon the set of objects, wherein the determining the first plurality of keypoints comprises removing one or more keypoints responsive to determining that the one or more keypoints intersect with one or more moving objects;
determining a second plurality of keypoints, associated with the first plurality of keypoints, on a second video frame of the plurality of video frames, wherein a keypoint of the second plurality of keypoints corresponds to a keypoint of the first plurality of keypoints;

determining, based upon the first plurality of keypoints and the second plurality of keypoints, a relationship between the first video frame and the second video frame;

determining, for projection of the graphical object, a second set of coordinates of the second video frame based upon the first set of coordinates and the relationship between the first video frame and the second video frame; and generating the augmented video comprising:
projecting the graphical object onto the second video frame based upon the second set of coordinates; and projecting the graphical object onto a second plurality of video frames of the plurality of video frames without projecting the graphical object onto a third video frame of the plurality of video frames responsive to determining that the third video frame has a level of distortion exceeding a threshold level of distortion.

14. The computing device of claim 13, wherein the threshold level of distortion is determined based upon one or more user-inputted settings received via a video interface associated with augmenting videos.

15. The computing device of claim 13, wherein:
the first set of coordinates is associated with a surface within the first video frame; and
the projecting the graphical object onto the first video frame comprises projecting the graphical object onto the surface.

16. The computing device of claim 13, wherein the determining the relationship between the first video frame and the second video frame comprises:
determining that a first keypoint of the first plurality of keypoints on the first video frame corresponds to a second keypoint of the second plurality of keypoints on the second video frame;
determining that a third keypoint of the first plurality of keypoints on the first video frame corresponds to a fourth keypoint of the second plurality of keypoints on the second video frame;
determining that a fifth keypoint of the first plurality of keypoints on the first video frame corresponds to a sixth keypoint of the second plurality of keypoints on the second video frame;
determining that a seventh keypoint of the first plurality of keypoints on the first video frame corresponds to an eighth keypoint of the second plurality of keypoints on the second video frame; and
determining a homography between the first video frame and the second video frame based upon a first pair of keypoints comprising the first keypoint and the second keypoint, a second pair of keypoints comprising the third keypoint and the fourth keypoint, a third pair of keypoints comprising the fifth keypoint and the sixth keypoint and a fourth pair of keypoints comprising the seventh keypoint and the eighth keypoint, wherein the relationship between the first video frame and the second video frame corresponds to the homography between the first video frame and the second video frame.

17. A non-transitory machine readable medium having stored thereon processor-executable instructions that when executed cause performance of operations, the operations comprising:
receiving a request to generate an augmented video based upon a graphical object and a video;
determining, for projection of the graphical object, a first set of coordinates of a first video frame of a plurality of video frames of the video;
projecting the graphical object onto the first video frame based upon the first set of coordinates;
determining a context of the video;
analyzing the first video frame, based upon the context of the video, to detect a set of objects within the first video frame;
determining a first plurality of keypoints on the first video frame based upon the set of objects;
determining a second plurality of keypoints, associated with the first plurality of keypoints, on a second video frame of the plurality of video frames, wherein a keypoint of the second plurality of keypoints corresponds to a keypoint of the first plurality of keypoints;
determining, based upon the first plurality of keypoints and the second plurality of keypoints, a relationship between the first video frame and the second video frame;
determining, for projection of the graphical object, a second set of coordinates of the second video frame based upon the first set of coordinates and the relationship between the first video frame and the second video frame; and
generating the augmented video comprising:
projecting the graphical object onto the second video frame based upon the second set of coordinates; and
projecting the graphical object onto a second plurality of video frames of the plurality of video frames without projecting the graphical object onto a third video frame of the plurality of video frames responsive to determining that the third video frame has a level of distortion exceeding a threshold level of distortion.

18. The non-transitory machine readable medium of claim 17, wherein the first set of coordinates of the first video frame is determined based upon one or more graphical object positioning characteristics in the request to generate the augmented video, wherein the one or more graphical object positioning characteristics comprise (i) a size of the graphical object with respect to at least one of the first video frame or one or more other video frames of the plurality of video frames and (ii) a positioning of the graphical object with respect to a surface within the first video frame.

19. The non-transitory machine readable medium of claim 17, wherein the first set of coordinates of the first video frame is determined based upon one or more graphical object positioning characteristics in the request to generate the augmented video, wherein the one or more graphical object positioning characteristics comprise a size of the graphical object with respect to at least one of the first video frame or one or more other video frames of the plurality of video frames.

20. The non-transitory machine readable medium of claim 17, wherein the first set of coordinates of the first video frame is determined based upon one or more graphical object positioning characteristics in the request to generate the augmented video, wherein the one or more graphical object positioning characteristics comprise a positioning of the graphical object with respect to a surface within the first video frame.

\* \* \* \* \*